US009945741B2

(12) United States Patent
Allard et al.

(10) Patent No.: US 9,945,741 B2
(45) Date of Patent: Apr. 17, 2018

(54) METHOD AND DEVICE FOR DETERMINING A TORQUE APPLIED UPON A ROTARY BODY THAT CAN BE DRIVEN ABOUT AN AXIS OF ROTATION

(71) Applicant: BARIGO Barometerfabrik GmbH, Villingen-Schwenningen (DE)

(72) Inventors: Gabriele Allard, Oppenheim (DE); Siegfried Gerlitzki, Oppenheim (DE)

(73) Assignee: BARIGO Barometerfabrik GmbH, Villingen-Schwenningen (DE)

( * ) Notice: Subject to any disclaimer, the term of this patent is extended or adjusted under 35 U.S.C. 154(b) by 439 days.

(21) Appl. No.: 14/431,403

(22) PCT Filed: Sep. 25, 2013

(86) PCT No.: PCT/EP2013/070025
§ 371 (c)(1),
(2) Date: Aug. 21, 2015

(87) PCT Pub. No.: WO2014/049029
PCT Pub. Date: Apr. 3, 2014

(65) Prior Publication Data
US 2015/0362387 A1 Dec. 17, 2015

(30) Foreign Application Priority Data

Sep. 27, 2012 (DE) .......................... 10 2012 109 173

(51) Int. Cl.
*G01L 3/10* (2006.01)
*G01L 3/00* (2006.01)
*G01L 3/08* (2006.01)

(52) U.S. Cl.
CPC .................. *G01L 3/00* (2013.01); *G01L 3/08* (2013.01); *G01L 3/10* (2013.01); *G01L 3/104* (2013.01)

(58) Field of Classification Search
CPC ................ G01L 3/08; G01L 3/10; G01L 3/12
See application file for complete search history.

(56) References Cited

U.S. PATENT DOCUMENTS 3,888,116 A 6/1975 Spinella
4,602,515 A 7/1986 Eichenlaub
(Continued)

FOREIGN PATENT DOCUMENTS

DE 38 26 023 A1 2/1989
DE 24 35 286 A 3/1997
(Continued)

OTHER PUBLICATIONS

Office Action for related German application 10 2012 0109 173.0, dated Jun. 5, 2013.
(Continued)

*Primary Examiner* — Bryan Bui
(74) *Attorney, Agent, or Firm* — Juneau & Mitchell

(57) ABSTRACT

The invention relates to a method and device for determining the torque applied upon the rotary body that can be driven about an axis of rotation, comprising a first and a second sensor, which are respectively arranged with a fastening element at the rotary body at an axial distance from each other, and which comprise rings surrounding the rotary body comprising fields showing alternating different signal behaviors, with one transmitter being allocated jointly to the first sensor and the second sensor, which jointly accept from the two sensors an output signal, from which a square-wave signal is formed, from which in a first step from the flank distances of certain inclining and/or declining flanks of the square-wave signal constant values $T_i$, are formed, which are dependent on the geometry of the rings of the two sensors, and variable values $\alpha_i$, which are dependent on the torque applied.

14 Claims, 18 Drawing Sheets

(56) References Cited

U.S. PATENT DOCUMENTS 4,811,612 A     3/1989   Mercat
6,460,422 B1 * 10/2002   Kuroda .................... G01L 3/12
                                                       73/862.324

FOREIGN PATENT DOCUMENTS

| DE | 19633380 A1 | 3/1997 |
|----|-------------|--------|
| DE | 198 17 886 A1 | 10/1999 |
| DE | 695 19 232 | 3/2001 |
| EP | 0954746 A1 | 11/1999 |
| WO | WO 96/06330 | 2/1996 |

OTHER PUBLICATIONS

International search report for related application PCT/EP2013/070025, dated Aug. 28, 2014.

* cited by examiner

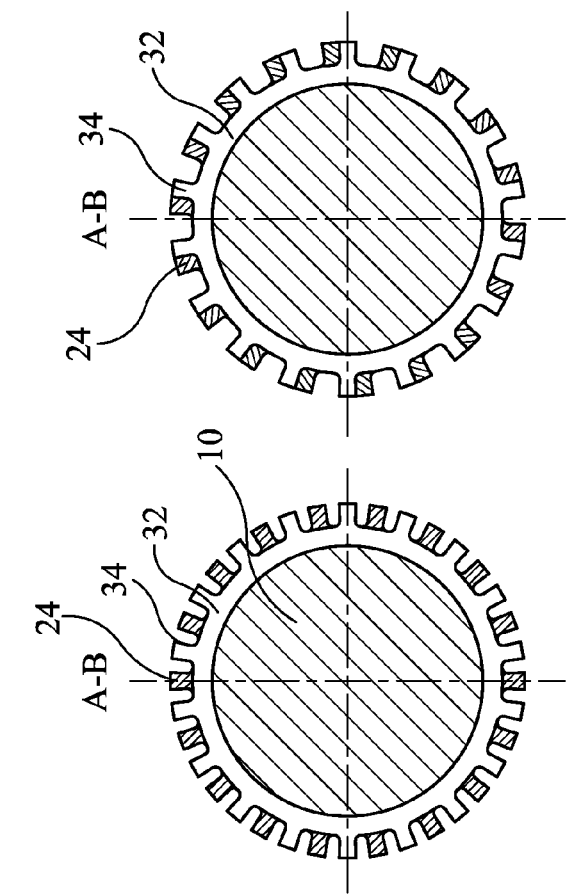
FIG. 3
FIG. 2
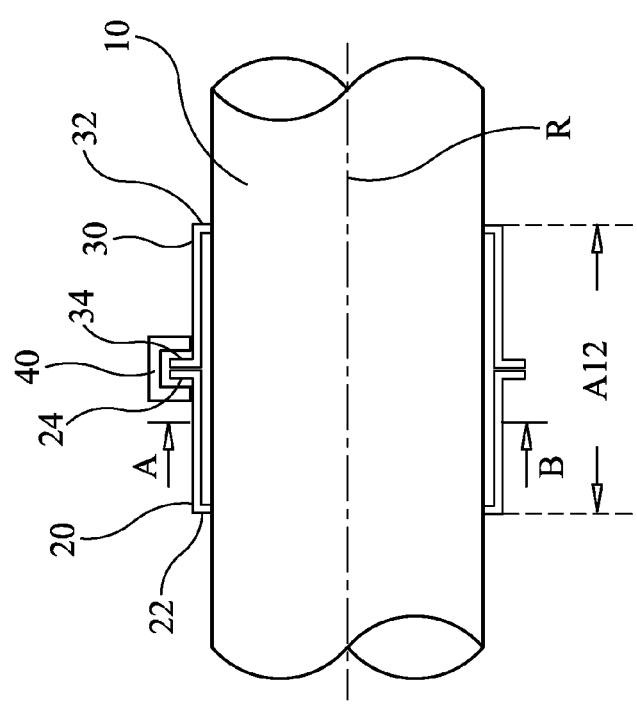
FIG. 1

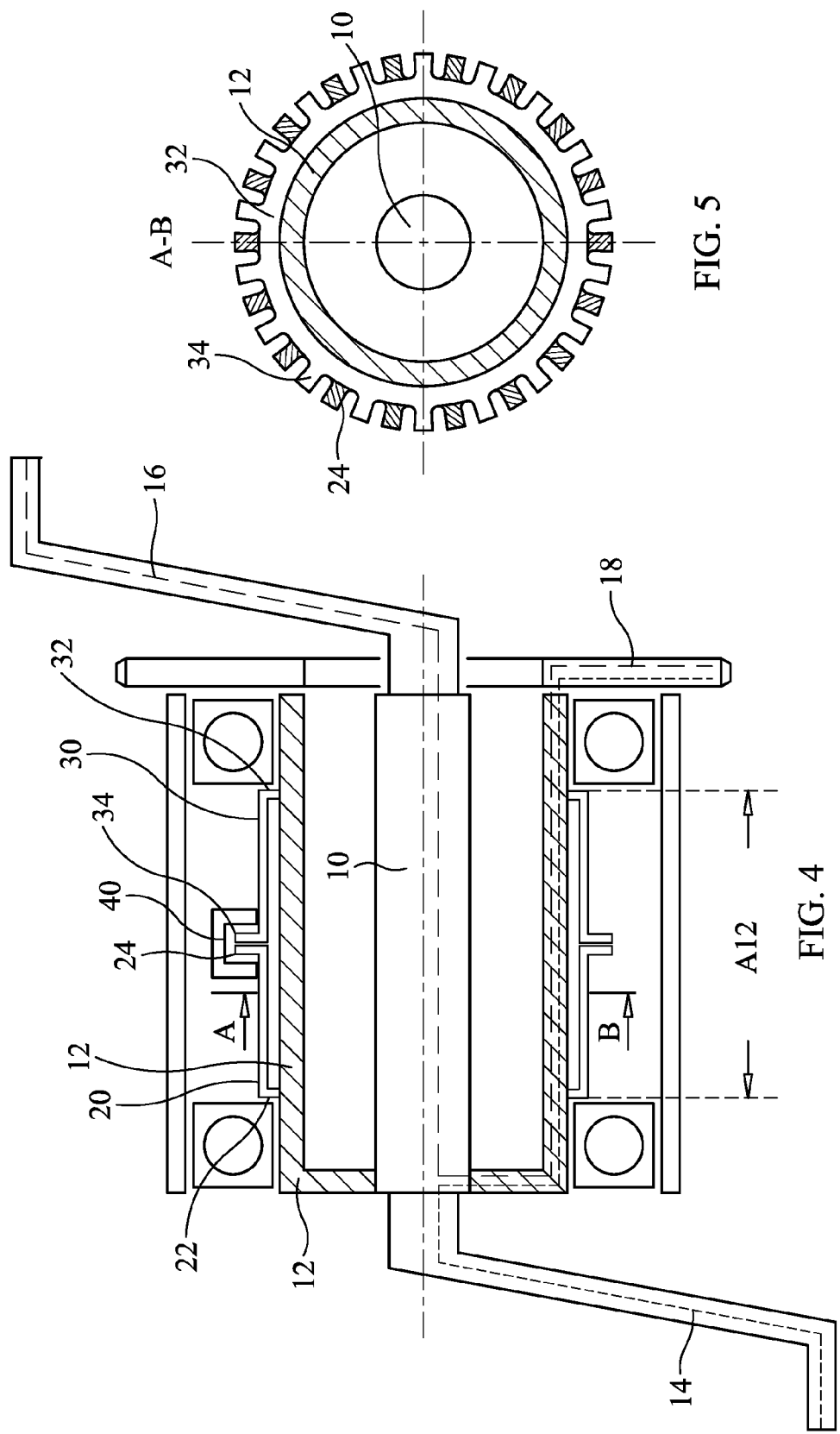

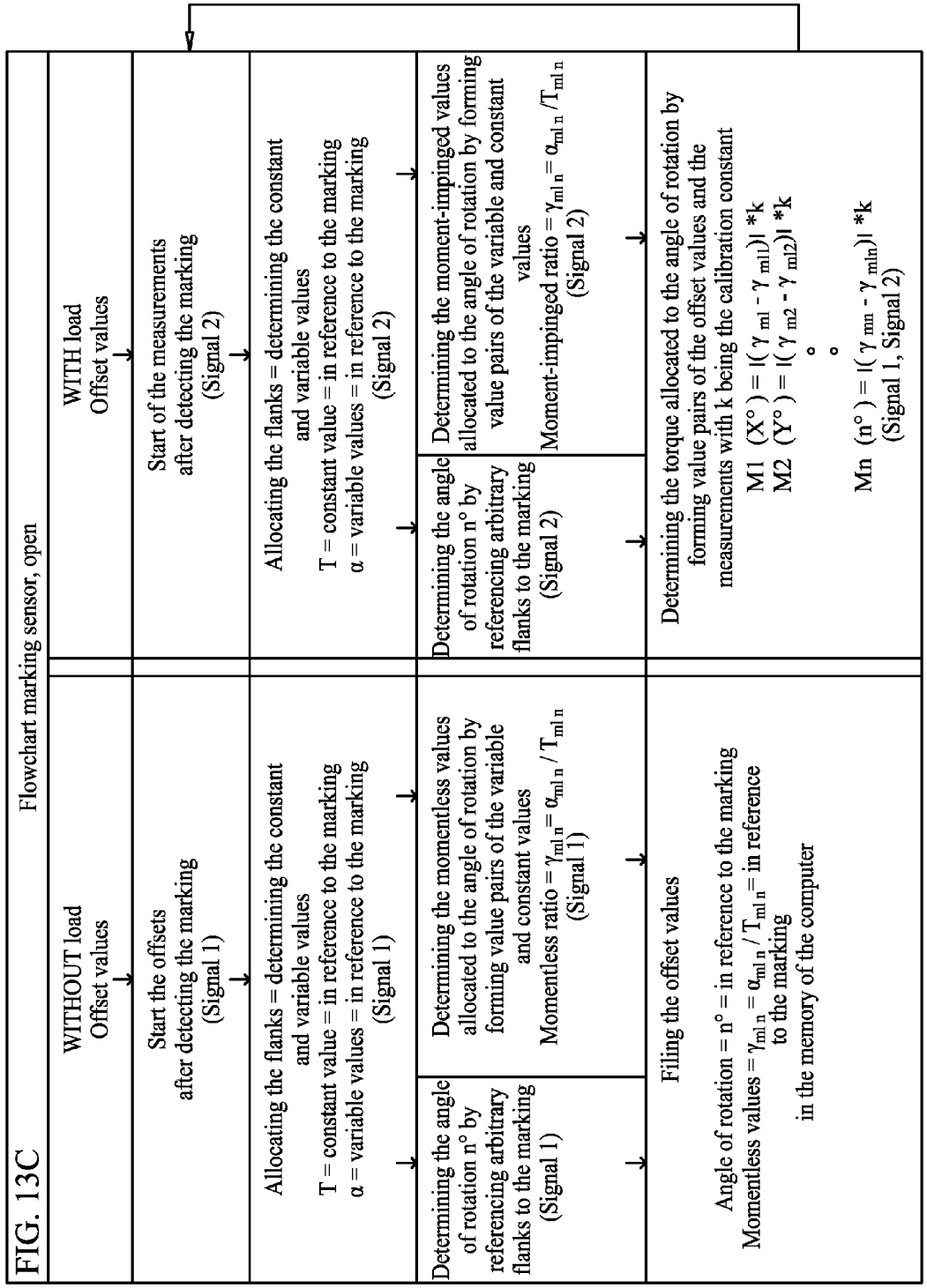

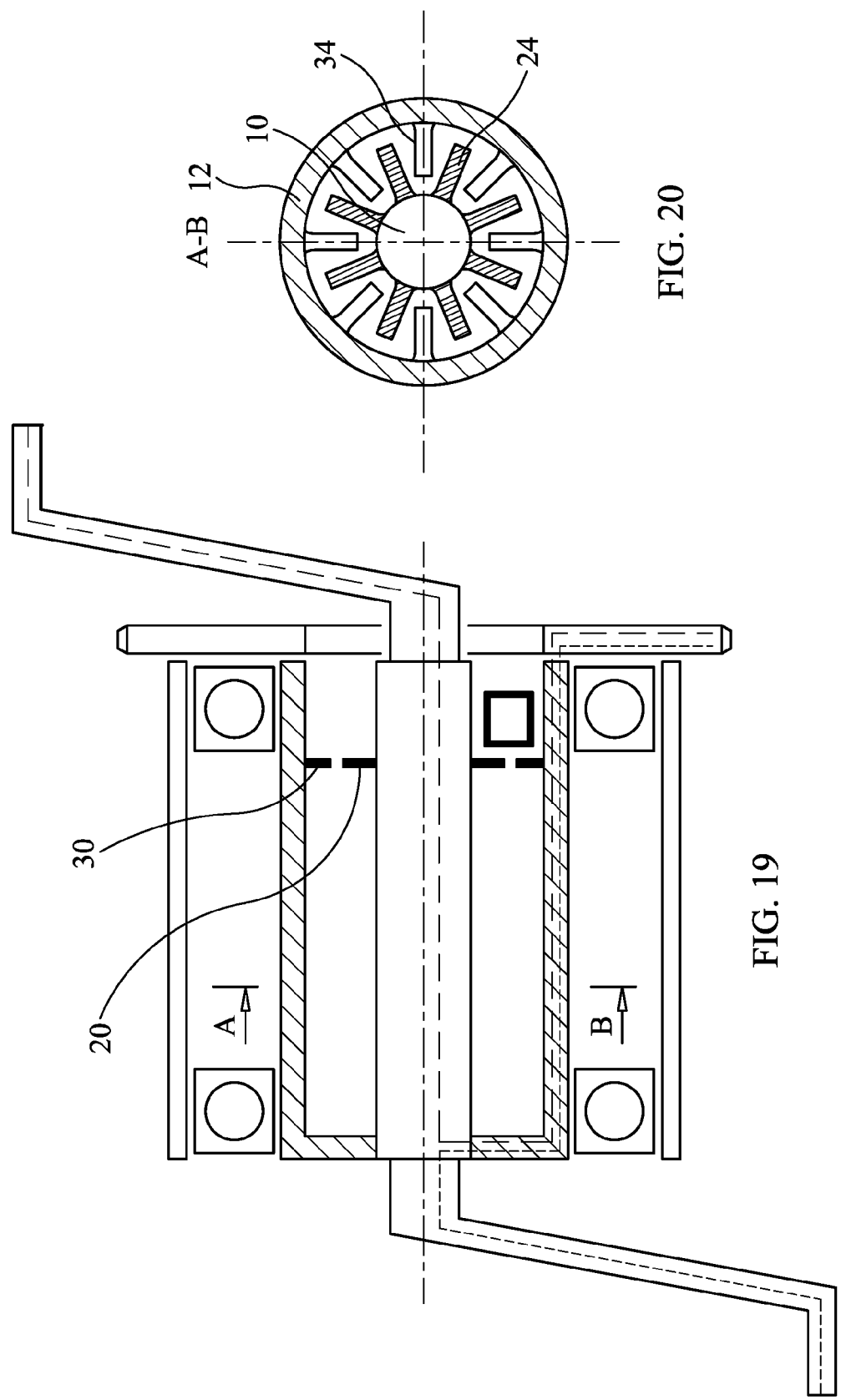

METHOD AND DEVICE FOR DETERMINING A TORQUE APPLIED UPON A ROTARY BODY THAT CAN BE DRIVEN ABOUT AN AXIS OF ROTATION

CROSS-REFERENCE TO RELATED APPLICATIONS

This patent application claims priority to International Patent Application PCT/EP2013/070025 and thereby to German Patent Application 10 2012 109 173.0, filed on Sep. 27, 2012.

STATEMENT REGARDING FEDERALLY SPONSORED RESEARCH OR DEVELOPMENT

No federal government funds were used in researching or developing this invention.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIEW THE OFFICE ELECTRONIC FILING SYSTEM (EFS-WEB)

Not applicable.

BACKGROUND OF THE INVENTION

Field of the Invention

The invention is a method and a device for determining a torque applied upon a rotary body that can be driven about an axis of rotation.

Description of Related Art Including Information Disclosed Under 37 CFR 1.97 and 1.98

A method and a device for determining the torque applied upon a rotary body that can be driven about an axis of rotation with a first and a second sensor, which are arranged at the rotary body at an axial distance from each other and rings surrounding the rotary body comprising alternating fields with different signal behavior, with preferably the number of the fields of both rings being identical, are known from EP 0 954 736 B1. The device described there comprises a first transmitter, allocated to a first sensor, and a second transmitter, allocated to the second sensor, both of which respectively providing an output signal, from which first and second square-wave signals are formed, with from the distances of the flanks of the first and the second square-save signals the average torque being determined over one full rotation of the rotary body.

Such an arrangement is disadvantageous in that for technical reasons relative motions occur between the transmitters and the sensors, which may falsify the measurements. Such a device is further disadvantageous in that the evaluation, based on complete rotations of the rotary body, allows only the determination of the average torque. Due to the fact that any determination of the torque requires at least one complete rotation of the rotary body, additionally only a slow measurement is possible with such a device.

The objective of the invention is therefore to provide a method and a device for determining the torque applied upon a rotary body that can be driven about an axis of rotation, which shows a design less susceptible to interferences and thus particularly allowing an improved detection of the actual average torque or the work performed.

The objective is attained according to the invention in a method for determining the torque applied upon a rotary body that can be driven about an axis of rotation, and a device for the determination of the torque applied upon rotary body that can be driven about an axis of rotation, each with the features as described herein.

BRIEF SUMMARY OF THE INVENTION

In a preferred embodiment, a method for determining the torque applied upon a rotary body that can be driven about an axis of rotation, comprising a first and a second sensor, each of which respectively arranged with a fastening element at the rotary body at an axial distance from each other and comprising rings surrounding the rotary body showing alternating different signal behaviors, wherein one transmitter is allocated jointly to the first sensor and the second sensor, which accepts jointly an output signal from both sensors, from which a square-wave signal is formed, from which in a first step from the flank distances of certain inclining and/or declining flanks of the square-wave signal constant values $T_i$ are determined, which are dependent on the geometry of the rings of the two sensors, and variable values $\alpha_i$, which are dependent on the torque applied, wherein, in an open arrangement of the two rings of the two sensors in reference to each other the constant values $T_i$, $T_i'$ are defined as the distance of one flank from the second-to-next flank aligned in the same direction or as the distance of two neighboring opposite flanks, particularly the distance between an inclining flank and a subsequent declining flank, and the variable values $\alpha_i$, $\alpha_i'$ as the distance of two neighboring opposite flanks, which are embodied opposite in reference to the flanks used to determine the constant values, particularly the distance between a declining flank and a subsequent inclining flank, or as the distance of two neighboring flanks aligned in the same direction, and that in an open arrangement of the two rings of the two sensors in reference to each other over one or more complete rotation(s) of the unstressed, torqueless rotary body the constant values $T_{mli}$, $i=1 \ldots n$ and the variable values $\alpha_{mli}$, $i=1 \ldots n$, allocated to the first sensor, are each added and the constant values $T_{mli}'$, $i=1 \ldots n$, and the variable values $\alpha_{mli}'$, $i=1 \ldots n$, allocated to the second sensor, are each added and momentless ratios $$\gamma_{ml} = (\alpha_{ml1} + \alpha_{ml2} + \ldots + \alpha_{mln})/(T_{ml1} + T_{ml2} + \ldots + T_{mln})$$

$$= \Sigma_{i=1}^{n} \alpha_{mli} / \Sigma_{i=1}^{n} T_{mli}$$

and $$\gamma'_{ml} = (\alpha'_{ml1} + \alpha'_{ml2} + \ldots + \alpha'_{mln})/(T'_{ml1} + T'_{ml2} + \ldots + T'_{mln})$$

$$= \Sigma_{i=1}^{n} \alpha'_{mli} / \Sigma_{i=1}^{n} T'_{mli}$$

are formed, with the $\gamma_{ml}$—values and $\gamma'_{ml}$—values meeting the following condition:

$$\gamma_{ml} \lessapprox \gamma'_{ml},$$

with over one or more complete rotations of the rotary body stressed with the torque to be determined the constant values $T_{mi}$, $i=1 \ldots n$, allocated to the first sensor, and the variable values $\alpha_{mi}$, i=1 . . . n, are each added and the constant values $T_{mi}'$, i=1 . . . n, allocated to the second sensor, and the variable values $\alpha_{mi}'$, i=1 . . . n are each added and the moment-impinged ratios $$\gamma_m = (\alpha_{m1} + \alpha_{m2} + \ldots + \alpha_{mn})/(T_{m1} + T_{m2} + \ldots + T_{mn})$$

$$= \Sigma_{i=1}^n \alpha_{mi} / \Sigma_{i=1}^n T_{mi}$$

and $$\gamma'_m = (\alpha'_{m1} + \alpha'_{m2} + \ldots + \alpha'_{mn})/(T'_{m1} + T'_{m2} + \ldots + T'_{mn})$$

$$= \Sigma_{i=1}^n \alpha'_{mi} / \Sigma_{i=1}^n T'_{mi}$$

are formed, with the $\gamma_m$—values and $\gamma'_m$—values meeting the following condition:

$$\gamma_m < \gamma'_m$$

with the work at the rotary body impinged with a moment being determined from the equations $$W = \int_0^{2\pi} M d\varphi = \overline{M} 2\pi \approx |(\gamma_m - \gamma_{m1})|k$$

and $$W' = \int_0^{2\pi} M' d\varphi = \overline{M'} 2\pi \approx |(\gamma'_m - \gamma'_{m1})|k,$$

with k representing a calibration constant and $\varphi$ the angle of rotation of the rotary body and with the entire torque being determined by $\overline{M} + \overline{M'}$, with $$\overline{M} = W/2\pi \approx |(\gamma_m - \gamma_{m1})|k/2\pi$$

and $$\overline{M'} = W'/2\pi \approx |(\gamma'_m - \gamma'_{m1})|k/2\pi.$$

In another preferred embodiment, the method as described herein, wherein the formation of totals during one rotation of the rotary body is newly started at least at two different flanks, preferably at every inclining and every declining flank.

In a preferred embodiment, a device for determining torque applied upon a rotary body that can be driven about an axis of rotation using the method as described herein, with a first and a second sensor, each of which arranged with a fastening element at the rotary body at an axial distance from each other, and rings surrounding the rotary body made from fields with alternating different signal behaviors, wherein one transmitter is arranged jointly to the first sensor and the second sensor, which accepts an output signal jointly from both sensors, from which a square-wave signal can be determined, and that not all fields of one ring show identical sizes.

In another preferred embodiment, the device as described herein, wherein at least one of the rings is distanced axially in reference to the fastening element of the corresponding sensor at the rotary body such that the rings of the two sensors are arranged without or with a small axial distance from each other.

In another preferred embodiment, the device as described herein, wherein the transmitter is based on an optic, inductive, magnetic, or capacitive principle.

In another preferred embodiment, the device as described herein, wherein the transmitter is arranged at the rotary body and/or at one or both of the sensors without any play.

In another preferred embodiment, the device as described herein, wherein the number of fields of both rings is identical.

In another preferred embodiment, the device as described herein, wherein the rings comprise transparent or absorbing fields or that the rings comprise reflecting and non-reflecting fields.

In another preferred embodiment, the device as described herein, wherein the rotary body is embodied as a pedal sprocket shaft bearing.

In another preferred embodiment, the device as described herein, wherein the rotary body is embodied as a pedal sprocket shaft bearing, with a torsion shaft being arranged around it, which is arranged with a first end at a first end of the pedal sprocket shaft bearing, with the output occurring at a second end of the torsion sheath opposite the first end, with one of the sensors being arranged at the torsion sheath and the other one of the sensors at the pedal sprocket shaft bearing.

In another preferred embodiment, the device as described herein, wherein the rotary body is embodied as a torsion sheath, which is arranged around a pedal sprocket shaft bearing and which is arranged with a first end at a first end of the pedal sprocket shaft bearing, with the output occurring at a second end of the torsion sheath opposite the first end, with both sensors being arranged at the torsion sheath.

In another preferred embodiment, the device as described herein, wherein the level of the fields of the rings is arranged cross-wise, particularly perpendicularly in reference to the axis of rotation of the rotary body.

In another preferred embodiment, the device as described herein, wherein the rings are embodied as an axial section of a cylindrical wall and show in the axial direction mutually engaging gears so that on a circumferential line alternating fields are arranged of the first sensor and the second sensor.

In another preferred embodiment, the device as described herein, further comprising means to determine the angle of rotation, which particularly include an additional sensor and an additional transmitter.

BRIEF DESCRIPTION OF THE SEVERAL
VIEWS OF THE DRAWINGS

FIG. 1 is a line drawing evidencing a schematic illustration of a first exemplary embodiment of a device according to the invention.

FIG. 2 is a line drawing evidencing a cross-section along the line A-B in FIG. 1 with a first alternative of the arrangement of the two sensors, namely an open arrangement of the two sensors, without the transmitter.

FIG. 3 is a line drawing evidencing a cross-section along the line A-B in FIG. 1 with a second alternative of the arrangement of the two sensors, namely a partially covered arrangement of the two sensors, without the transmitter.

FIG. 4 is a line drawing evidencing a schematic illustration of a second exemplary embodiment of a device according to the invention.

FIG. 5 is a line drawing evidencing a cross-section along the line A-B in FIG. 4 without the transmitter.

Figure 6A:
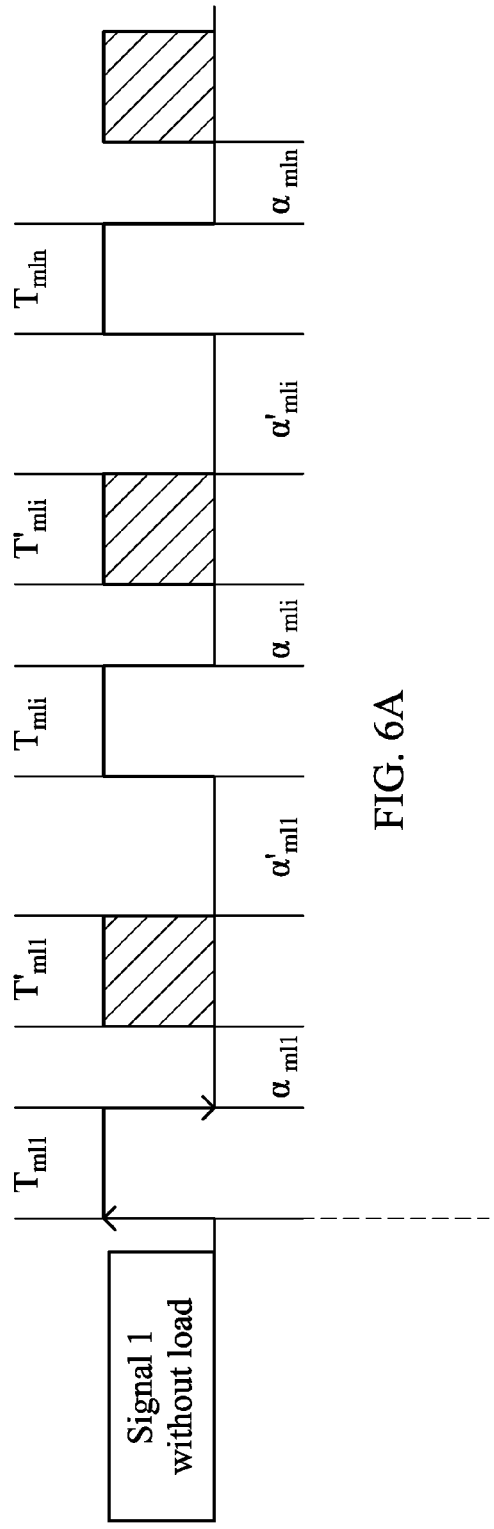

FIG. 6*a* is a line drawing evidencing the square-wave signal, generated by the transmitter in an open arrangement of the sensor for example according to FIG. 2 or 5, without any torque applied and with a first option allocating a flank.

Figure 6B:
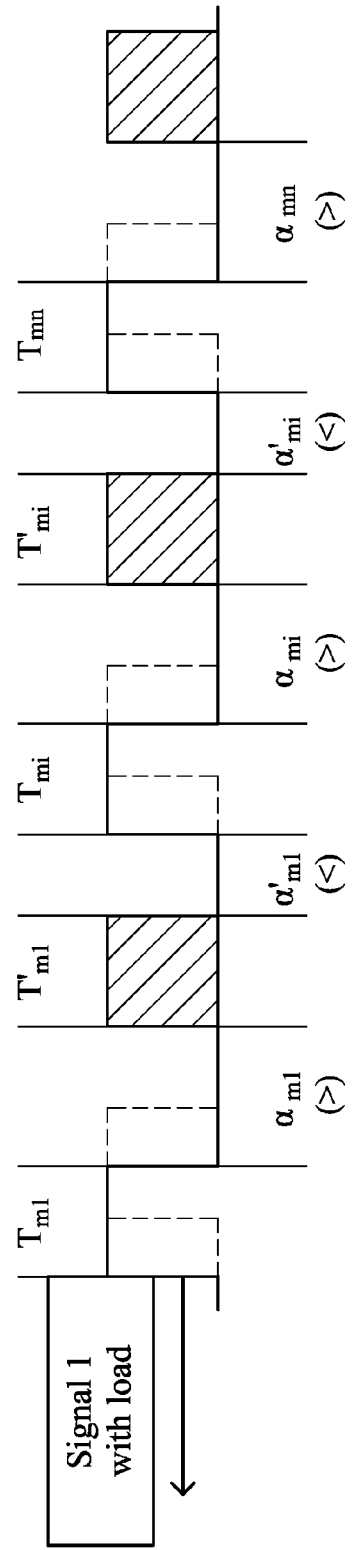

FIG. 6*b* is a line drawing evidencing the square-wave signal generated by the transmitter in an open arrangement of the sensors, for example according to FIG. 2 or 5, with torque applied and with the flank allocation according to FIG. 6*b*.

Figure 6C:
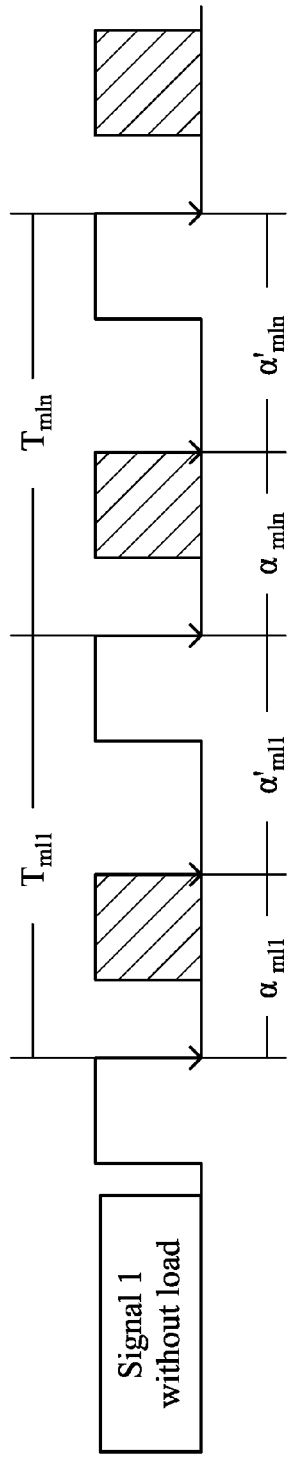

FIG. 6*c* is a line drawing evidencing the square-wave signal generated by the transmitter in an open arrangement of the sensors, for example according to FIG. 2 or 5, without any torque applied and with a second option of the flank allocation.

Figure 6D:
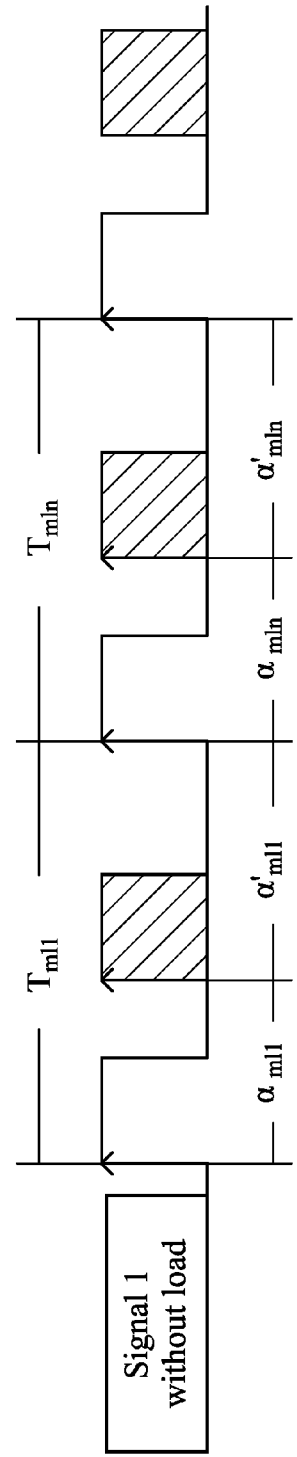

FIG. 6d is a line drawing evidencing the square-wave signal generated by the transmitter in an open arrangement of the sensors, for example according to FIG. 2 of 5, without any torque applied and with a third option of the flank allocation.

Figure 6E:
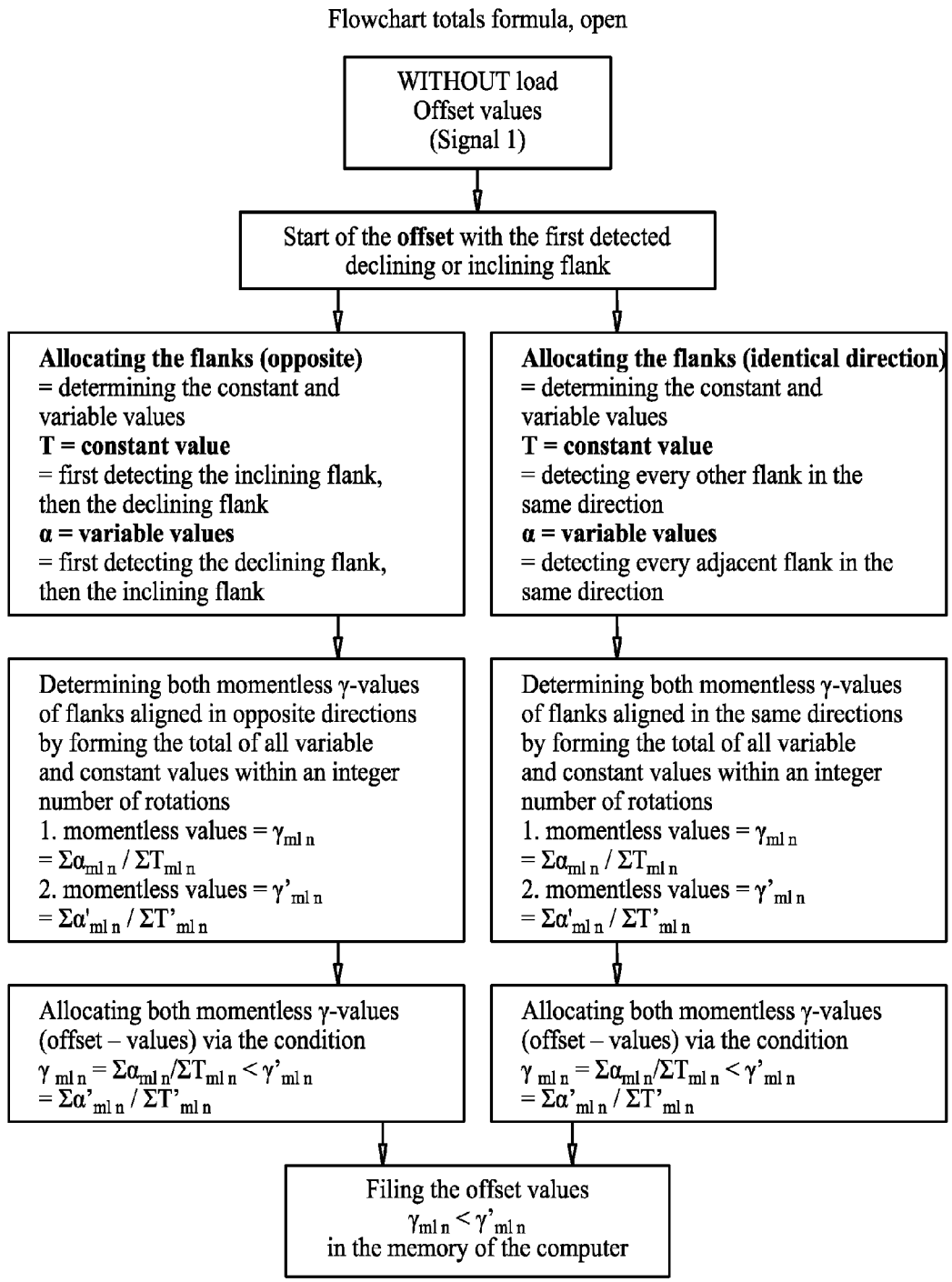

FIG. 6e is a line drawing evidencing a first part of a flowchart to determine the torque from the signals according to FIG. 6a and 6b or 6c or 6d.

Figure 6F:
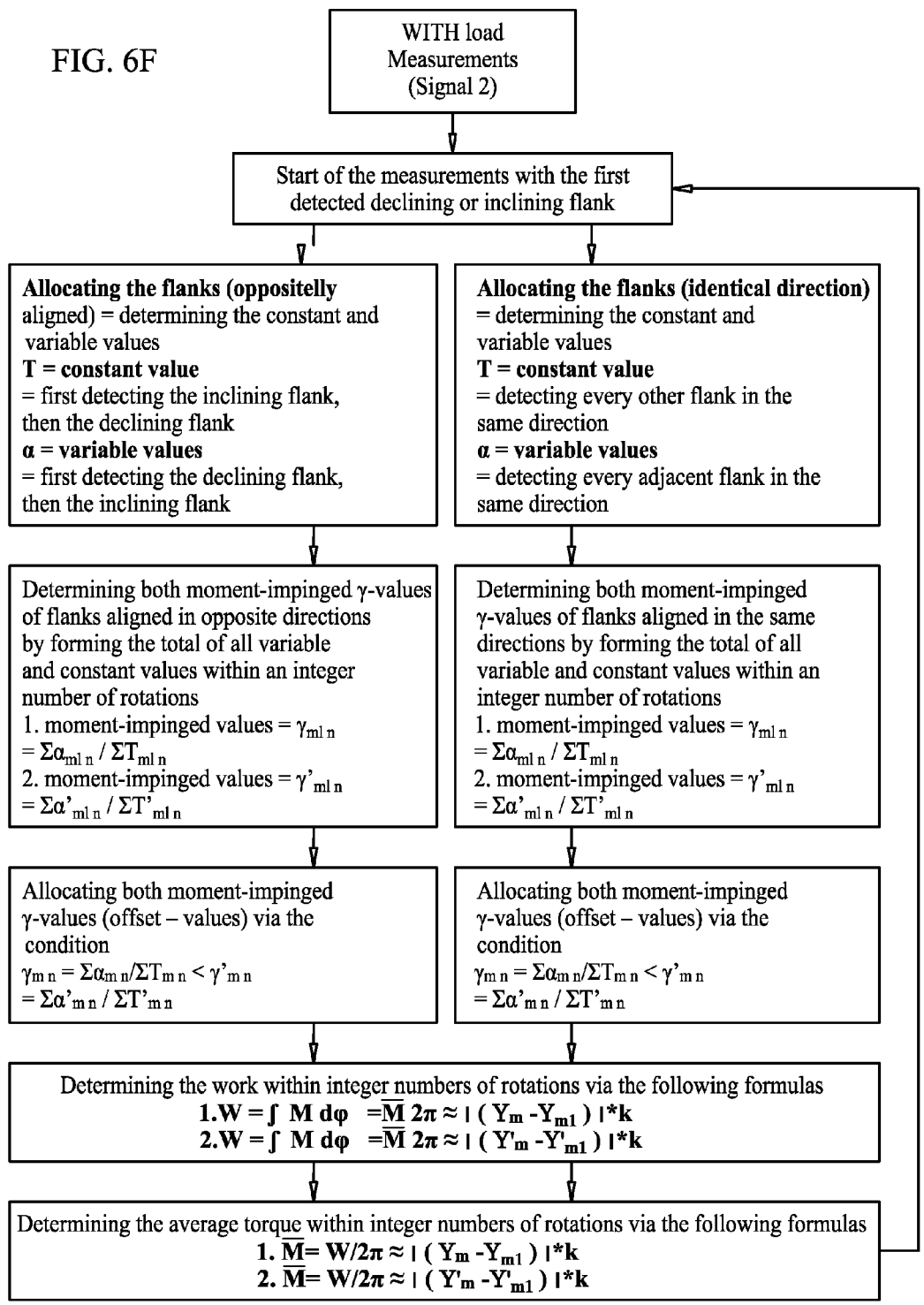

FIG. 6f is a line drawing evidencing a second part of the flowchart to determine the torque from the signals according to FIGS. 6a and 6b or 6c and 6d.

Figure 7:
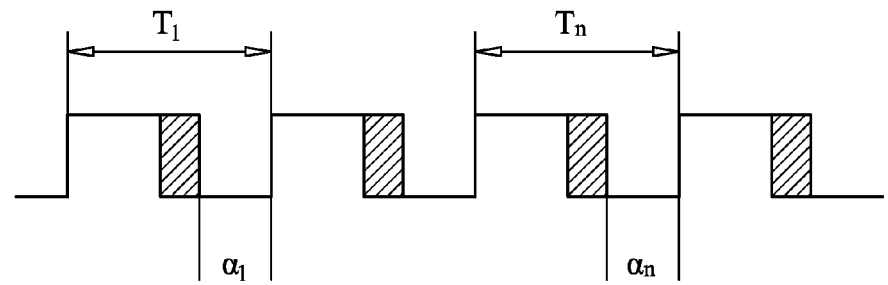

FIG. 7 is a line drawing evidencing the square-wave signal generated by the transmitter in a partially covered arrangement of the sensors, for example according to FIG. 3, without any torque applied.

Figure 8:
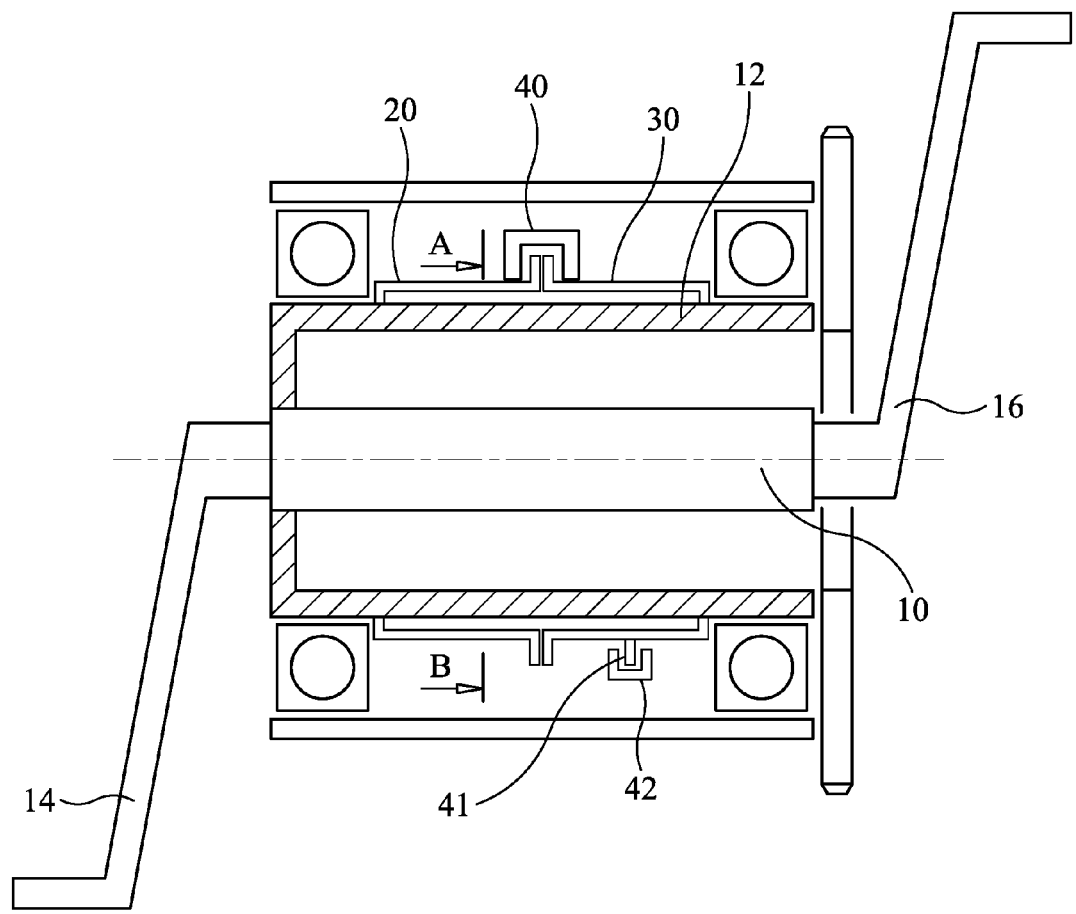

FIG. 8 is a line drawing evidencing a schematic illustration of a third exemplary embodiment of a device according to the invention.

Figure 9:
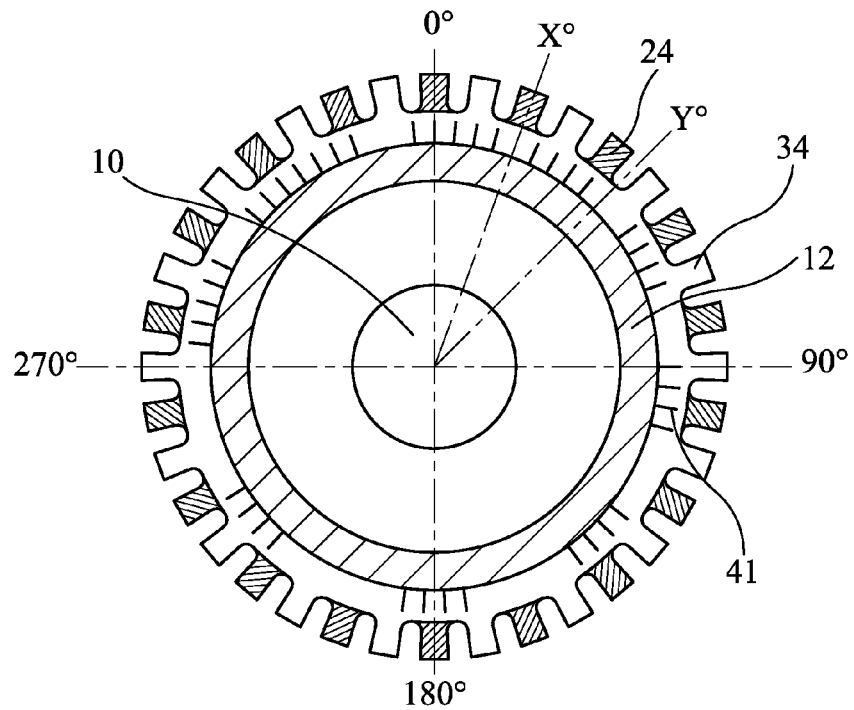

FIG. 9 is a line drawing evidencing a cross-section along the line A-B in FIG. 8 without the transmitter.

Figure 10:
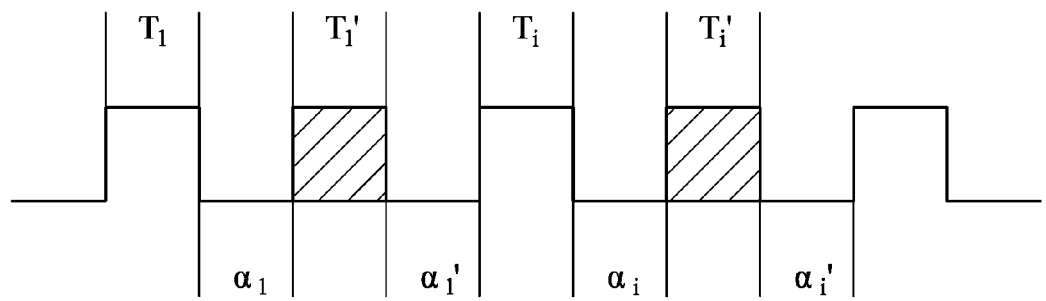

FIG. 10 is a line drawing evidencing the square-wave signal generated by the transmitter of the device according to FIG. 8.

Figure 11:
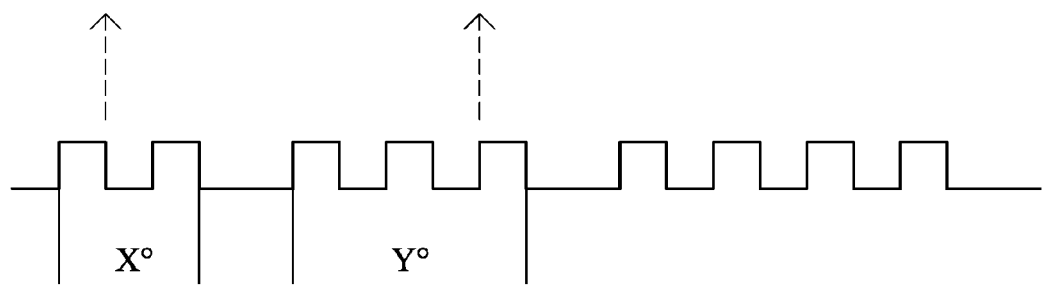

FIG. 11 is a line drawing evidencing the signal generated by the additional transmitter of the device according to FIG. 8.

Figure 12:
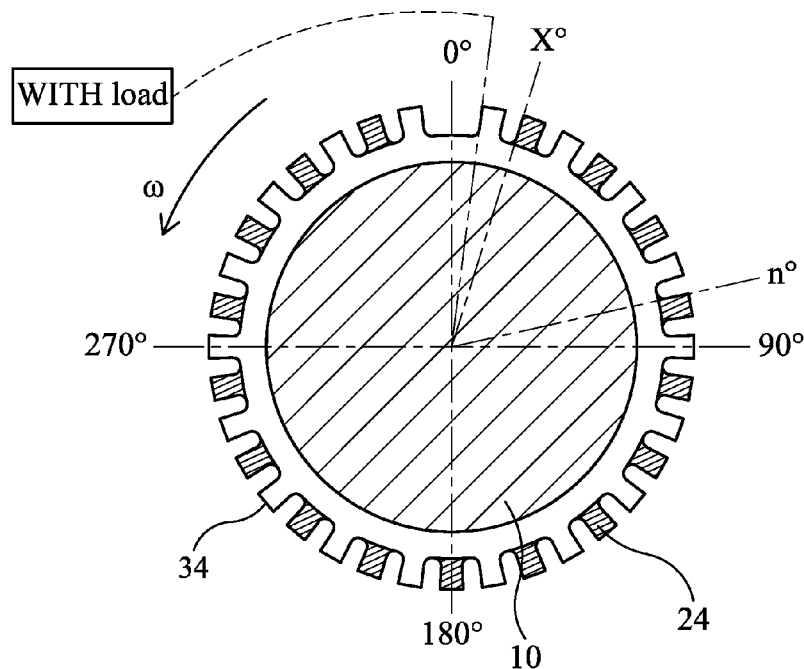

FIG. 12 is a line drawing evidencing an alternative embodiment of the sensors.

Figure 13A:
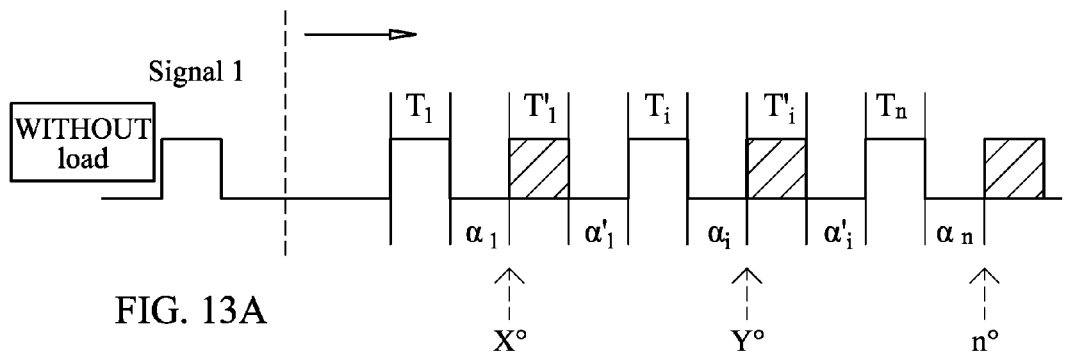

FIG. 13a is a line drawing evidencing the square-wave signal generated by the transmitter in an arrangement of the sensors according to FIG. 12 without any torque applied.

Figure 13B:
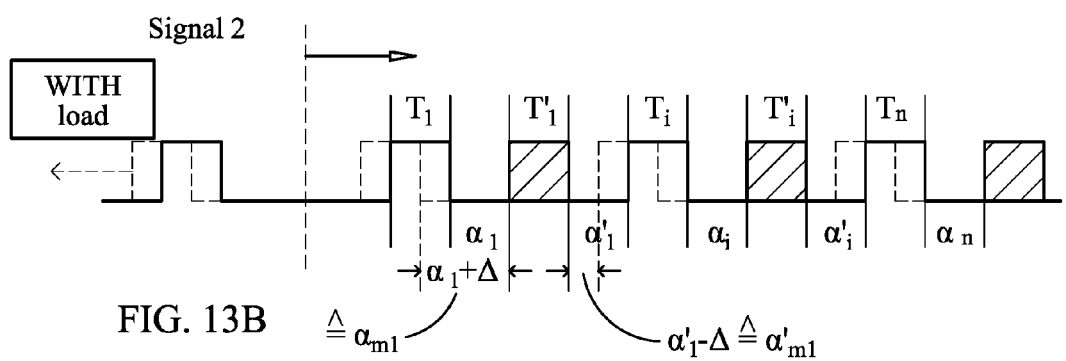

FIG. 13b is a line drawing evidencing the square-wave signal generated by the transmitter in an arrangement of the sensors according to FIG. 12 with torque applied.

FIG. 13c is a line drawing evidencing a flowchart for determining the torque from the signals according to FIGS. 13a and 13b.

Figure 14:
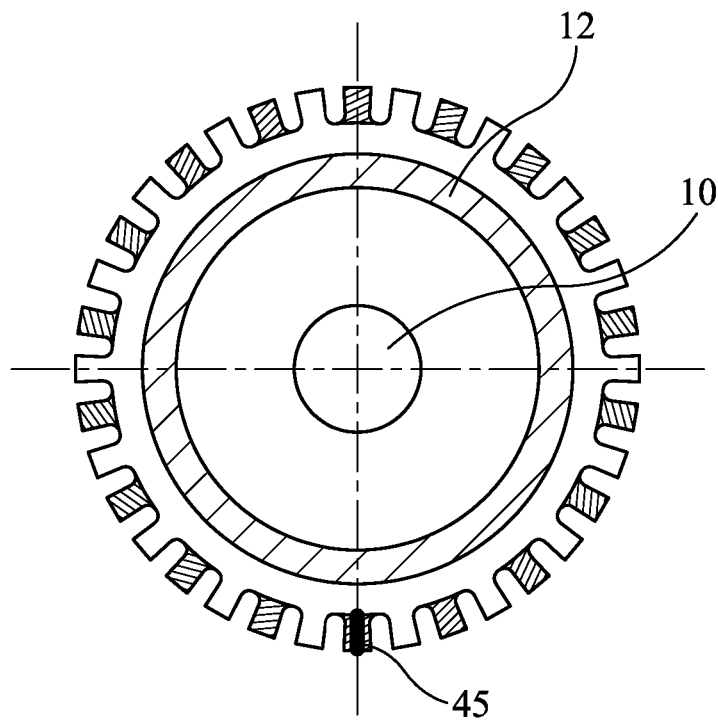

FIG. 14 is a line drawing evidencing another alternative embodiment of the sensors.

Figure 15:
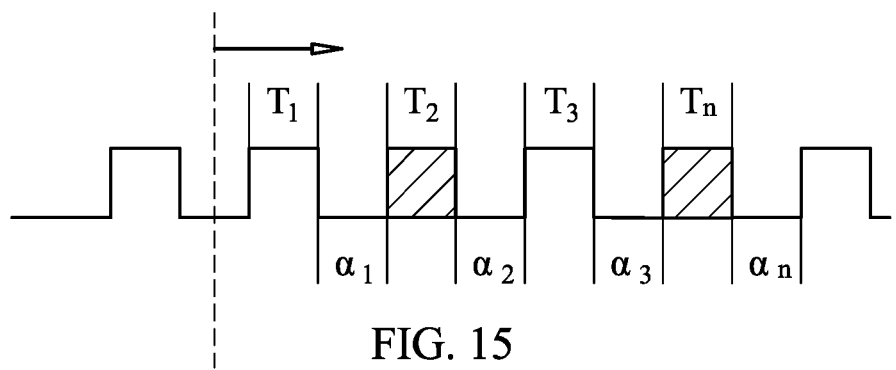

FIG. 15 is a line drawing evidencing the square-wave signal generated by the transmitter in an arrangement of the sensors according to FIG. 14.

Figure 16:
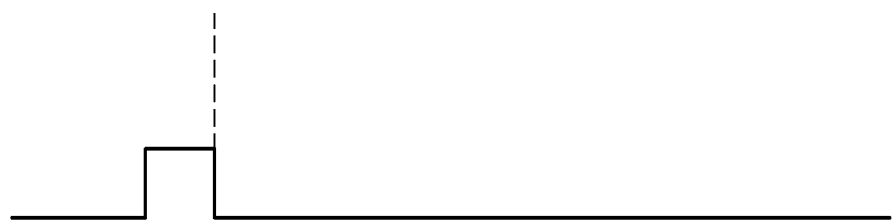

FIG. 16 is a line drawing evidencing the trigger signal generated with the pulse generator according to FIG. 14.

Figure 17:
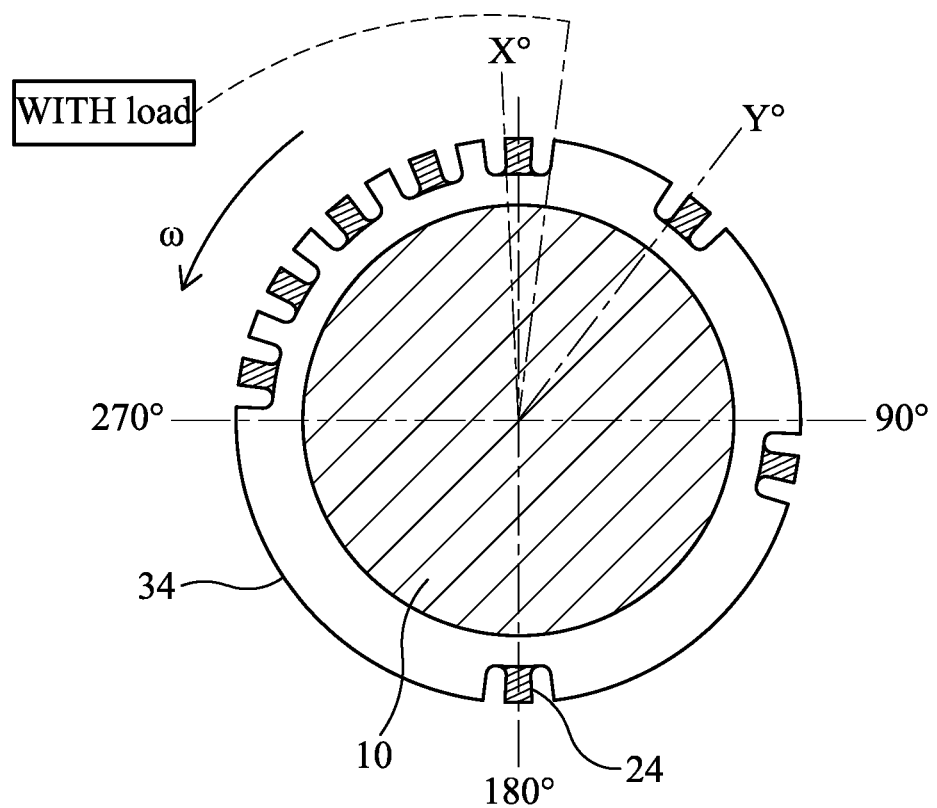

FIG. 17 is a line drawing evidencing another alternative embodiment of the sensors.

Figure 18A:
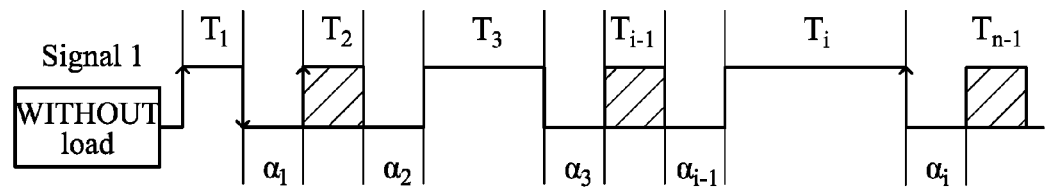

FIG. 18a is a line drawing evidencing the square-wave signal generated by the transmitter in an arrangement of the sensors according to FIG. 17 without any torque applied.

Figure 18B:
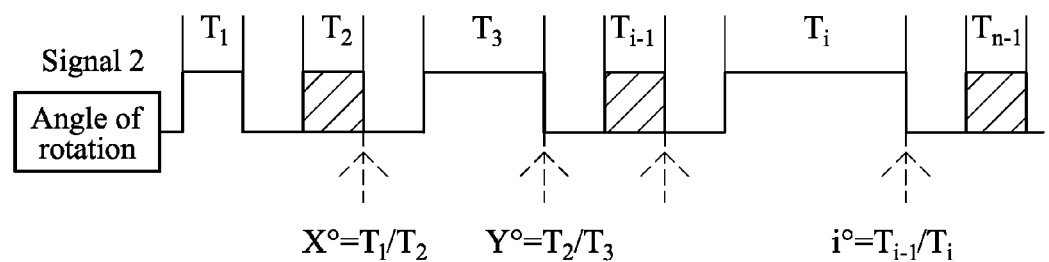

FIG. 18b is a line drawing evidencing the square-wave signal generated by the transmitter in an arrangement of the sensors according to FIG. 17 without any torque applied and with a determination of the angle of rotation.

Figure 18C:
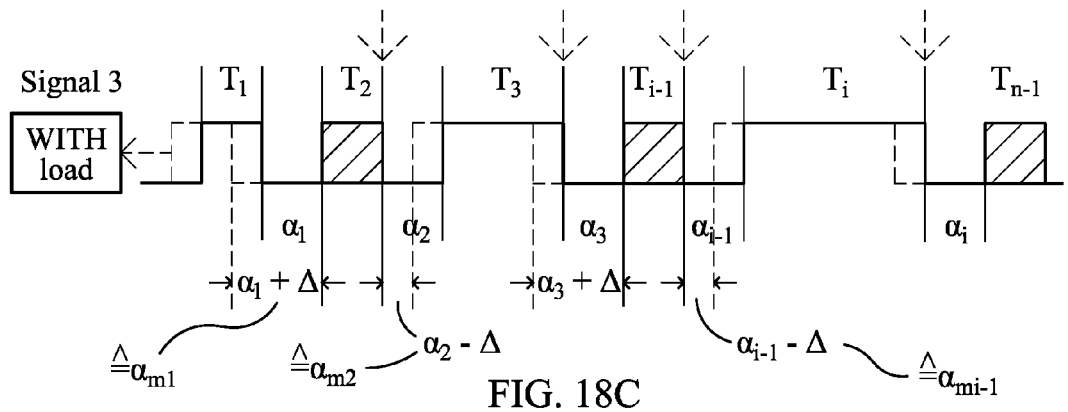

FIG. 18c is a line drawing evidencing the square-wave signal generated by the transmitter in an arrangement of the sensors according to FIG. 17 with torque applied.

Figure 18D:
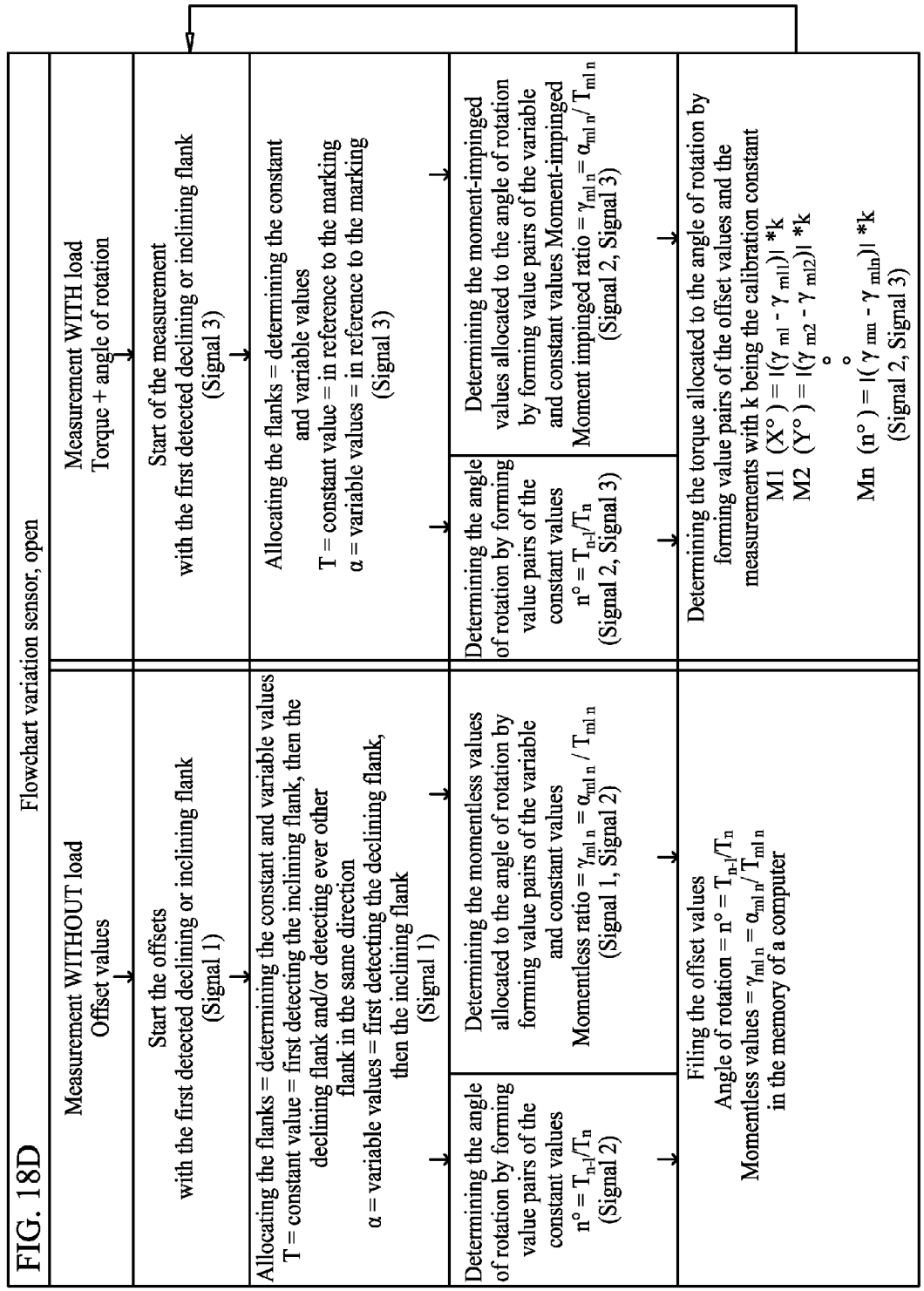

FIG. 18d is a line drawing evidencing the flowchart for determining the torque and the angle of rotation from the signals according to FIGS. 18a, 18b, and 18c.

Figure 18E:
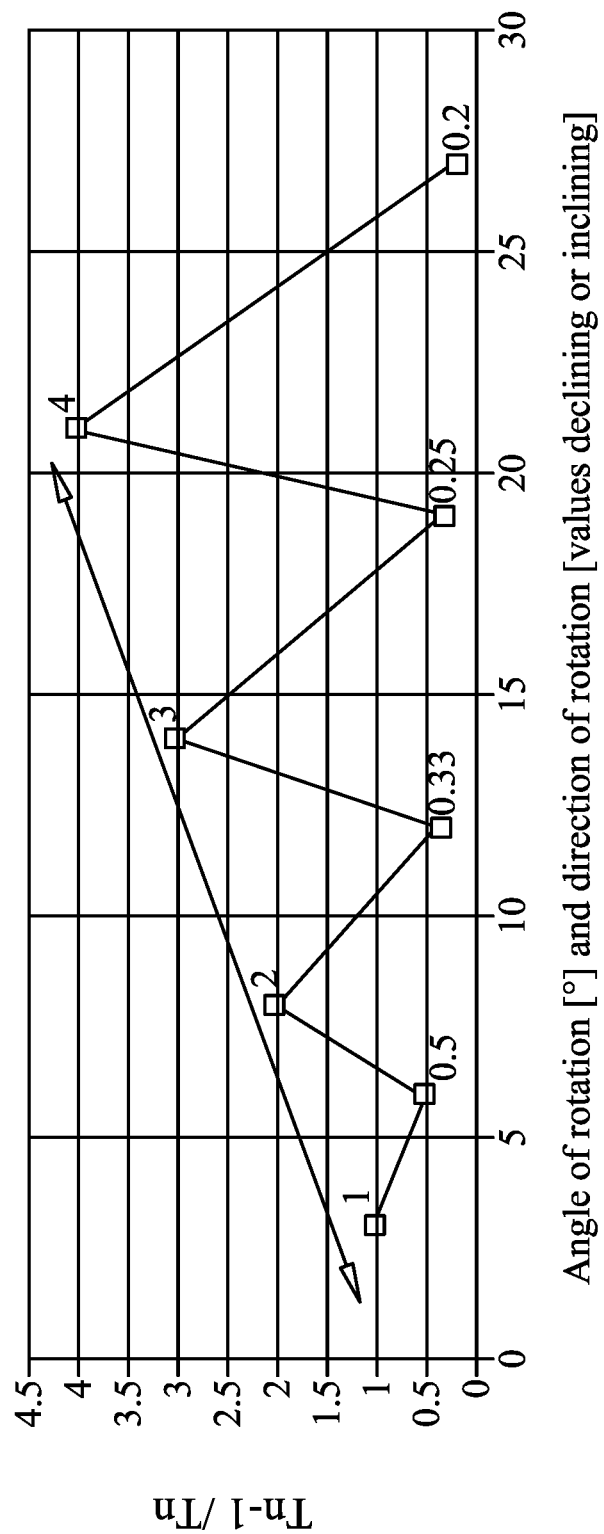

FIG. 18e is a line drawing evidencing an illustration to determine the angle and the direction of rotation from the signals according to FIGS. 18a, 18b, and 18c.

FIG. 19 is a line drawing evidencing a schematic illustration of another exemplary embodiment of a device according to the invention.

FIG. 20 is a line drawing evidencing a cross-section along the line A-B in FIG. 19.

Figure 21:
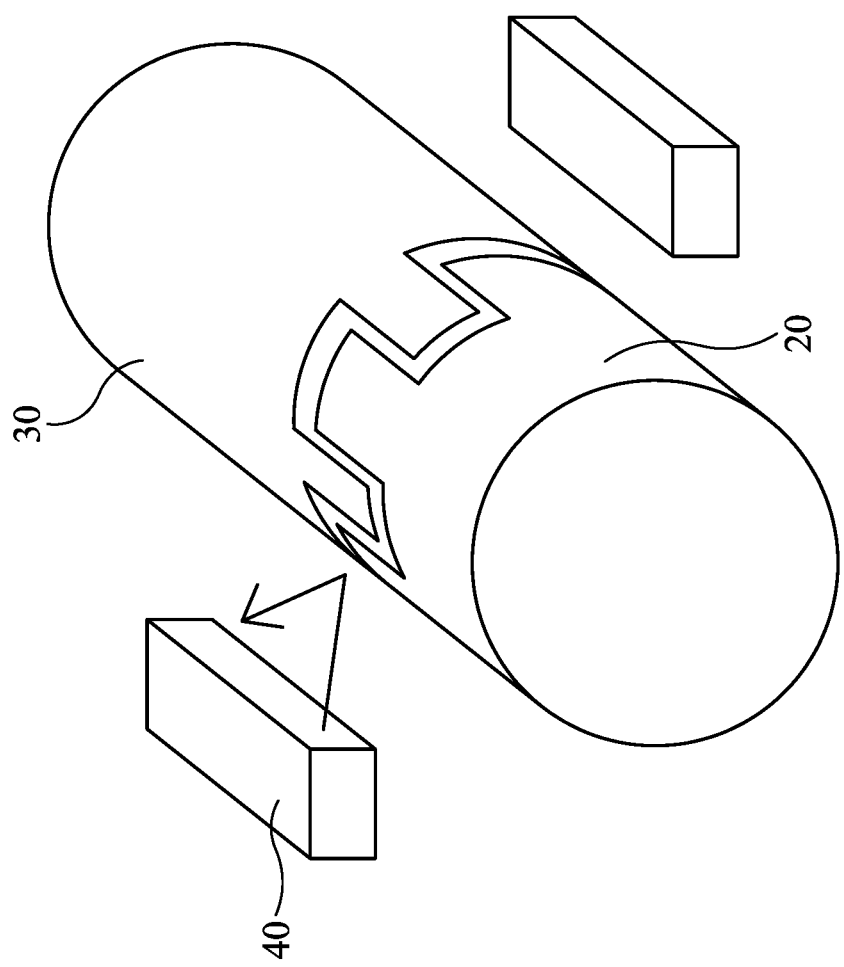

FIG. 21 is a line drawing evidencing a perspective view of two axially engaging sensors.

Figure 22:
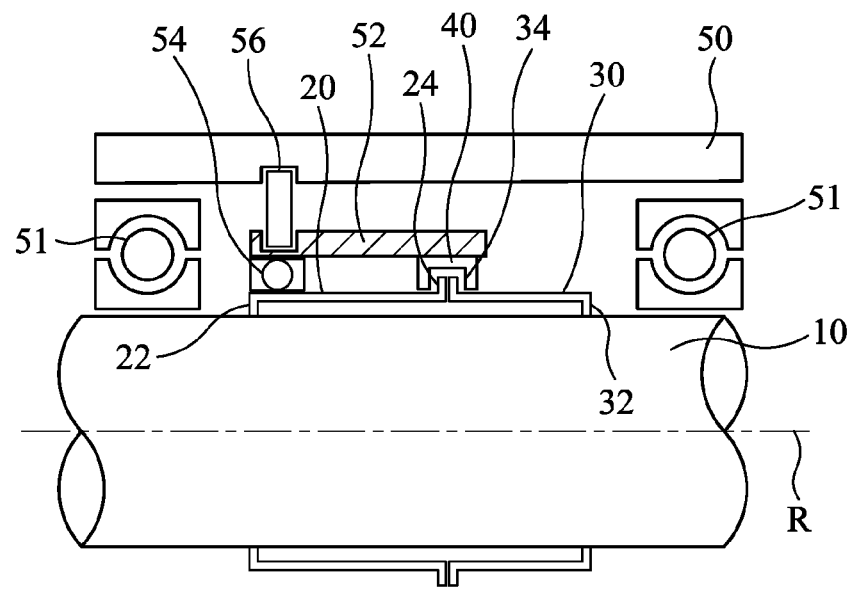

FIG. 22 is a line drawing evidencing a schematic illustration of another exemplary embodiment of a device according to the invention.

Figure 23:
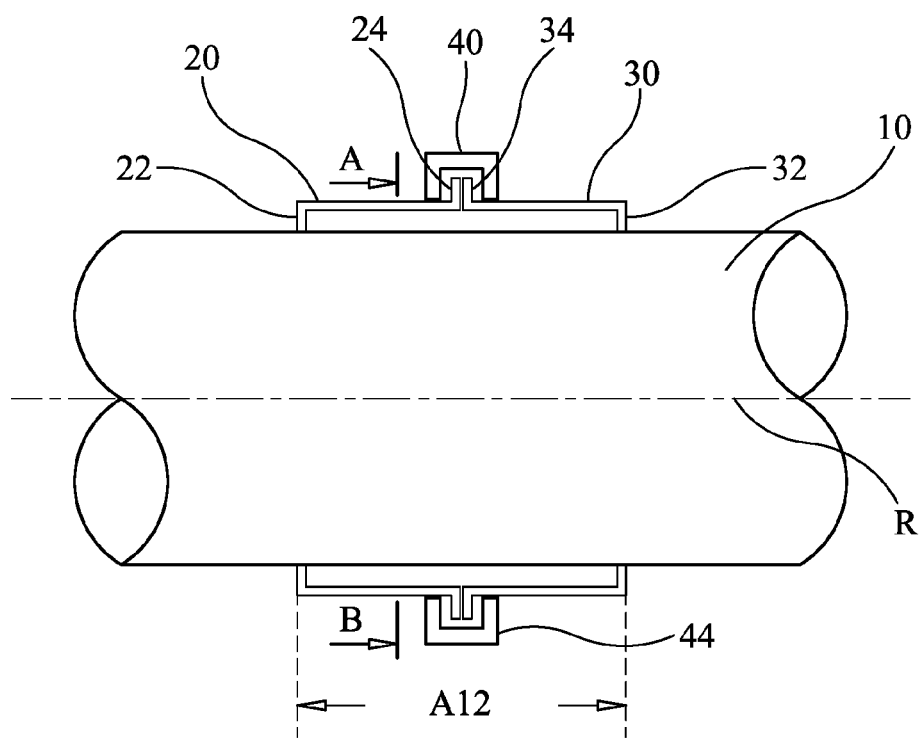

FIG. 23 is a line drawing evidencing a schematic illustration of another exemplary embodiment of a device according to the invention.

DETAILED DESCRIPTION OF THE INVENTION

The method according to the invention for the determination of the torque applied upon the rotary body that can be driven about an axis of rotation, comprising a first and a second sensor, each arranged via a fastening element at the rotary body at an axial distance from each other and comprising rings, surrounding the rotary body, showing fields with alternating and different signal behaviors, is characterized in that one transmitter is allocated jointly to the first sensor and the second sensor, which accepts the output signal jointly of both sensors, from which a square-wave signal is formed, from which in a first step from the distances of the flanks of certain inclining and/or declining flanks of the square-wave signal constant values $T_i$ are determined, which are dependent on the geometry of the rings of the two sensors and particularly are independent from the torque applied, and variable values $\alpha_i$, which are dependent on the torque applied.

The essential concept of the invention is the fact that the rings of the two sensors are combined at an effective location and only one transmitter is used for determining a single square-wave signal, which is influenced by both sensors. Here it is however essential that the fastening elements of the sensors are axially distanced from each other at the rotary body to be measured, because otherwise torque cannot be determined.

Preferably, in an open arrangement of the two rings of the two sensors in reference to each other the constant values $T_i$, $T_i'$ are embodied as the distance of one flank to the second-to-next flank aligned in the same direction or as the distance of two neighboring opposite flanks, particularly the distance between an inclining flank and a subsequent declining flank, and the variable values $\alpha_i$, $\alpha_i'$ as the distance between two neighboring opposite flanks, which are embodied opposite in reference to the flanks used for the determination of the constant values, particularly the distance between a declining flank and a subsequent inclining flank, or defined as the distance of two adjacent flanks aligned in the same direction and in a partially covered arrangement of the two rings of the two sensors in reference to each other the constant values $T_i$ are defined as the distance between two neighboring flanks aligned in the same direction and the variable values $\alpha_i$ as the distance of two neighboring opposite flanks. This allocation allows the determination of the torque from a single square-wave signal. The values $T_i$, $T_i'$ are particularly equivalent to the width of the signal-generating fields of the rings or of a period, which includes a signal-generating field and a subsequent field, not generating a field, so that the values $T_i$, $T_i'$ are predetermined by the constructive design of the rings and remain constant under the load of a torque. The values $\alpha_i$, $\alpha_i'$ are particularly equivalent to the distance of two signal-generating fields of different sensors, which upon distortion of the two sensors in reference to each other are variable based on the torsion of the rotary body depending on the torque applied.

An advantageous embodiment of the invention provides that in a covered arrangement of the two rings of the two sensors in reference to each other over one or more complete rotations of the unstressed, torqueless rotary body the constant values $T_{mli}$, i-1 . . . n and the variable values $\alpha_{mli}$, i=1 . . . n, each added, and the momentless ratio $$\gamma_{ml} = (\alpha_{ml1} + \alpha_{ml2} + \ldots + \alpha_{mln})/T_{ml1} + T_{ml2} + \ldots T_{mln})$$

$$= \Sigma_{i=1}^{n} \alpha_{mli} / \Sigma_{i=1}^{n} T_{mli}$$

is formed, with over one or more complete rotations of the rotary body stressed with the torque to be determined the constant values $T_{mi}$, i=1 . . . n, and the variable values $\alpha_{mi}$, i=1 . . . n, are each added and the moment-impinged ratio $$\gamma_m = (\alpha_{m1} + \alpha_{m2} + \ldots + \alpha_{mn})/(T_{m1} + T_{m2} + \ldots + T_{mn})$$

$$= \Sigma_{i=1}^{n} \alpha_{mi} / \Sigma_{i=1}^{n} T_{mi}$$

is formed, with the work at the moment-impinged rotary body being determined from the equation $$W = \int_0^{2\pi} M d\varphi = \overline{M} 2\pi \approx (\gamma_m - \gamma_{m1}) k,$$

with k representing a calibration constant and φ the angle of rotation of the rotary body, and that the average torque applied upon the rotary body being determined from the equation $$\overline{M} = W/2\pi \approx (\gamma_m - \gamma_{m1}) k / 2\pi$$

A preferred embodiment of the invention provides that in an open arrangement of the two rings of the two sensors in reference to each other over one or more complete rotations of the unstressed, torqueless rotary body the constant values $T_{mli}$, i=1 . . . n and the variable values $\alpha_{mli}$, i=1 . . . n, allocated to the first sensor, are each added and the constant values $T_{mli}'$, i=1 . . . n and the variable values $\alpha_{mli}'$, i=1 . . . n, allocated to the second sensor, are each added and the momentless ratios $$\gamma_{ml} = (\alpha_{ml1} + \alpha_{ml2} + \ldots + \alpha_{mln})/(T_{ml1} + T_{ml2} + \ldots + T_{mln})$$

$$= \Sigma_{i=1}^{n} \alpha_{mli} / \Sigma_{i=1}^{n} T_{mli}$$

and $$\gamma_{ml}' = (\alpha_{ml1}' + \alpha_{ml2}' + \ldots + \alpha_{mln}')/(T_{ml1}' + T_{ml2}' + \ldots + T_{mln}')$$

$$= \Sigma_{i=1}^{n} \alpha_{mli}' / \Sigma_{i=1}^{n} T_{mli}'$$

are formed, with the $\gamma_{ml}$—values and the $\gamma_{ml}'$—values meeting the following condition:

$$\gamma_{ml} < \gamma_{ml}'$$

with over one or more complete rotations of the rotary body stressed with a torque to be determined the constant values $T_{mi}$, i=1 . . . n and the variable values $\alpha_{mi}$, i=1 . . . n, allocated to the first sensor, are each added and the constant values $T_{mi}'$, i=1 . . . n and the variable values $\alpha_{mi}'$, i=1 . . . n, allocated to the second sensor, are each added and the moment-impinged ratios $$\gamma_m = (\alpha_{m1} + \alpha_{m2} + \ldots + \alpha_{mn})/(T_{m1} + T_{m2} + \ldots + T_{mn})$$

$$= \Sigma_{i=1}^{n} \alpha_{mi} / \Sigma_{i=1}^{n} T_{mi}$$

and $$\gamma_m' = (\alpha_{m1}' + \alpha_{m2}' + \ldots + \alpha_{mn}')/(T_{m1}' + T_{m2}' + \ldots + T_{mn}')$$

$$= \Sigma_{i=1}^{n} \alpha_{mi}' / \Sigma_{i=1}^{n} T_{mi}'$$

are formed, with the $\gamma_m$—values and the $\gamma_m'$—values meeting the following condition:

$$\gamma_{ml} < \gamma_{ml}'$$

with the work at the moment-impinged rotary body being determined from the equations $$W = \int_0^{2\pi} M d\varphi = \overline{M} 2\pi \approx (\gamma_m - \gamma_{m1}) k$$

and $$W' = \int_0^{2\pi} M' d\varphi = \overline{M}' 2\pi \approx (\gamma_m' - \gamma_{m1}') k,$$

with k representing a calibration constant and φ the angle of rotation of the rotary body and with the entire torque being determined by $\overline{M} + \overline{M}'$, with $$\overline{M} = W/2\pi \approx (\gamma_m - \gamma_{m1}) k / 2\pi$$

and $$\overline{M}' = W'/2\pi \approx (\gamma_m' - \gamma_{m1}') k / 2\pi.$$

According to a particularly preferred embodiment of the invention, the addition process is newly started during one rotation of the rotary body at least at two different flanks, preferably at every inclining flank and/or every declining flank. This way it is possible during the rotation of the rotary body, at least after one complete rotation, to issue several torque values per rotation, which increases the precision of the measurement, and for example several torque values of one rotation may be averaged in order to improve the evaluation.

Advantageously the angle of rotation of the rotary body can be determined via the square-wave signal, particularly by forming the ratio of two constant values $T_i/T_j$ or by determining the distance of one flank of the square-wave signal from a marking in the square-wave signal caused by at least one mark at one of the two sensors. The determination of the angle of rotation based on the square-wave signal provides the advantage that no additional transmitter is required.

A particularly preferred embodiment of the invention provides that for determining a torque, allocated to an angle of rotation of the unstressed, torqueless rotary body, the momentless ratio $$\gamma_{mli} = \alpha_{mli}/T_{mi}$$

and the moment-impinged ratio $$\gamma_{mi} = \alpha_{mi}/T_{mi}$$

are formed, with the torque applied upon the moment-impinged rotary body being determined from the equation $$Mi \approx (\gamma_{mi} - \gamma_{mli}) k,$$

with k representing a calibration constant.

This way it is possible, even when a full rotation of the rotary body has not yet occurred, to yield information regarding the torque applied, so that shortly after the onset of rotation a value can already be determined for said torque.

The device according to the invention for determining the torque applied upon a rotary body that can be driven about an axis of rotation with a first and a second sensor, each of which arranged via a fastening element at the rotary body at an axial distance from each other and comprising rings surrounding the rotary body, comprising alternating fields which are different in their signal behavior, is characterized in that a transmitter is allocated jointly to the first sensor and the second sensor, which accepts jointly from both sensors an output signal, from which a square-wave signal can be determined.

The essential concept of the invention is to combine the rings of the two sensors at one effective location and only to use a single transmitter for determining a single square-wave signal, which is influenced by both sensors, allowing a simplified design and a construction of the device that is less susceptible to interference.

The combination of the two sensors at an effective location is improved such that at least one of the rings is axially distanced from the fastening element of the corresponding sensor at the rotary body such that the rings of the two sensors are arranged without any or with only a small axial distance in reference to each other.

The rings of the two sensors may be arranged without any axial distance from each other, for example axially engaging each other or radially engaging each other, or arranged at a small axial distance from each other. Here, a small axial distance is understood as a distance, which is considerably shorter than the axial distance of the fastening elements of the two sensors, for example less than 10%, particularly preferred less than 5%, or even less than 1% of the axial distance of the fastening elements. In particular, a small distance shall be understood as a distance within the scope of the axial thickness of the rings or within the size of the oscillating motion of the rings during rotation so that during the distortion of the two rings in reference to each other no contacting of the rings occurs and thus no damaging of said rings. In other words, the two rings are located as closely as possible towards each other and particularly abstain from contacting each other. In order to allow an axial distance between the fastening elements of the sensor and the ring of the respective sensor, said respective sensor may show for example a cylindrical sheath, which is fastened with one end at the rotary body and with the respective ring being arranged at its opposite end.

According to a preferred embodiment of the invention, the transmitter is based on an optic, inductive, magnetic, or capacitive principle, optimizing the resolution depending on the application, which optimizes the production costs and/or allows minimizing the susceptibility to malfunctions.

A preferred embodiment of the invention provides that the transmitter is arranged at the rotary body and/or at one or both of the sensors without any play. This way the relative motion between the transmitter and the sensors can be almost eliminated so that the device becomes less susceptible to interferences.

Preferably, the number of fields is identical for both rings, which can simplify the evaluation process.

According to an advantageous embodiment of the invention, not all of the fields of one ring are embodied of identical sizes. Particularly, all identical fields of one ring may be embodied with different sizes. A variation of the width of the fields allows a determination of the angle and the direction of rotation of the sensor.

Preferably, the rings show transparent and absorbing fields or reflecting and non-reflecting fields so that a transmitter can be used based on an optic principle, which allows a particularly cost-effective embodiment of the device according to the invention. Here, the transparent fields or the non-reflecting fields may particularly be realized as gaps or holes in the sensor, which allows a particularly simple production.

According to a particularly preferred embodiment of the invention, the rotary body is embodied as a pedal sprocket shaft bearing in order to allow determining the torque in bicycles, ergometers, and indoor bicycles, and to allow providing the option for determining the work performed and preferably yielding the performance in Watt. The fastening of the two sensors at the pedal sprocket shaft bearing represents a particularly simple design.

In an alternative embodiment the rotary body is formed as a pedal sprocket shaft bearing, about which a torsion sheath is arranged, which is arranged with a first end at a first end of the pedal sprocket shaft bearing, with here the output occurring at a second end of the torsion sheath, opposite the first end, with one of the sensors being arranged at the torsion sheath and the other one of the sensors at the pedal sprocket shaft bearing. By the use of a torsion sheath the torque applied by two cranks upon the bottom bracket sheath can be transferred reliably to the output.

Due to the fact that one of the sensors is arranged at the torsion sheath, which in turn is arranged at the pedal sprocket shaft bearing, the torsion of the pedal sprocket shaft bearing and/or the torsion sheath can be determined with the help of the two sensors. In particular, when using the torsion sheath it is possible to detect the torque at both sides. When fastening one of the sensors at the torsion sheath and the other sensor at the pedal sprocket shaft bearing, additionally a space-saving arrangement can be achieved of the two sensors and the transmitter in the space between the pedal sprocket shaft bearing and the torsion sheath.

According to another alternative of the invention, the rotary body is embodied as a torsion sheath, which is arranged about a pedal sprocket shaft bearing and which is arranged with a first end at a first end of the pedal sprocket shaft bearing, with the output occurring at a second end of the torsion sheath located opposite the first end, with both sensors being arranged at the torsion sheath. The torsion sheath represents a rotary body as well, which due to the fact that it is fastened with one end at the pedal sprocket shaft bearing and with the other end forms the output, which leads for example to the rear wheel, is also rotated. The fastening of both sensors at the torsion sheath allows a simple fastening of the two sensors.

According to an advantageous embodiment of the invention, the level of the fields of the rings is arranged crosswise, particularly perpendicular in reference to the axis of rotation of the rotary body. Such an arrangement of the rings allows a simple retrofitting of the rotary body.

Advantageously the rings are embodied as an axial section of a cylindrical wall and show a gearing engaging in the axial direction, so that on a circumferential line alternating fields are arranged of the first sensor and the second sensor. This allows a particularly space-saving arrangement of the two rings. This arrangement is particularly suitable for reflection light sensors or transmitters.

According to a preferred embodiment of the invention, additional means are provided for determining the angle of rotation, which comprise particularly an additional sensor and an additional transmitter so that both the absolute angle of rotation as well as the direction of rotation can be determined, with particularly as early as upon a rotation of the rotary body about a few degrees the position and the torque are determined without this requiring a complete rotation of the rotary body.

The device according to the invention is particularly used for implementing the method according to the invention.

DETAILED DESCRIPTION OF THE FIGURES

FIG. 1 shows a schematic illustration of a first exemplary embodiment of a device according to the invention. The device comprises a rotary body 10, which may be embodied for example as a pedal sprocket shaft bearing of a bicycle, an ergometer, or indoor bicycle. A first sensor 20 and a second sensor 30 are fastened at the rotary body 10, at an axial distance A12. The first sensor 20 is here fastened via a fastening element 22, the second sensor 30 via a fastening element 32 at the rotary body 10. Both the first sensor 20 and the second sensor 30 respectively comprising a ring 24, 34 surrounding the rotary body 10, which show alternating fields with different signal behaviors. The fields may be formed for example by optic structures, inductive, magnetic, or capacitive elements or the like. As shown in FIG. 2 or 3, in a simple embodiment the rings 24, 34 are formed as annular elements with radially arranged rectangular elements, arranged at the annular elements, preferably arranged at an even angular distance from each other, which for example are formed from a light-impermeable or reflective material in order to generate a signal behavior different from the empty spaces arranged therebetween. The rectangular elements therefore form a type of fields, the empty spaces arranged therebetween a different type of fields. Depending on the measuring principle the rectangular elements generate a signal, for example when a reflecting element is observed by an optic sensor, which element is illuminated from the same side, or the empty spaces arranged therebetween generate a signal, for example when the sensors are arranged between a light source and an optic sensor. In the following, the rectangular elements are considered the signal-generating elements, i.e. they generate a pulse in the square-wave signal with an inclining flank and a subsequent declining flank. When the empty spaces located therebetween represent signal-generating elements, the directions of the inclining and declining flanks are appropriately inversed.

The rings 24, 34 are arranged axially distanced in reference to the respective fastening elements 22, 32 according to an embodiment shown in FIG. 1, for example such that a the fastening element 22 of the first sensor 20 is arranged with one end at a cylindrical sheath, while the corresponding ring 24 of the first sensor 20 is arranged at the opposite end of the cylindrical sheath. In the same fashion, the fastening element 32 of the second sensor 30 may be arranged at one end of a cylindrical sheath, while the ring 34 is arranged at the opposite end of the cylindrical sheath.

In this embodiment, the rings 24, 34 are embodied particularly at the cylindrical sheath as circumferential collars, and thus particularly aligned in a radial fashion, with particularly the level extending through the fields of the rings 24, 34 extending perpendicular in reference to the axis of rotation R of the rotary body 10.

The rings 24, 34 of the two sensors 20, 30 are provided in an arrangement of the sensors 20, 30 at the rotary body 10 with a small axial distance from each other. The axial distance between the two rings 24, 34 is nearly 0. The two rings 24, 34 are particularly arranged in reference to each other such that they abstain from mutually contacting each other, even in case of a relative rotation of the two sensors 20, 30 to each other. In particular, the distance between the rings 24, 34 is significantly smaller than the axial distance A12 between the two fastening elements 22, 32, for example less than 10% of the axial distance A12, in particular less than 5%, or preferably even less than 1% of the axial distance A12.

The transmitter 40 is arranged such that it accepts an output signal, which is influenced by the two sensors 20, 30. The transmitter 40 may be based on various physical principles, for example optic, inductive, magnetic, or capacitive principles, and for this purpose it shows particularly a transmitter and a receiver. A simply constructed design results when the transmitter 40 is based on an optic principle, which operates in one embodiment in a transmitted light method or in another embodiment in a reflection method, with both rings 24, 34 being arranged between the transmitter and the receiver of the transmitter 40 in the transmitted light method. From the output signal of the transmitter 40 a square-wave signal is formed, with an inclining or declining flank being generated between two neighboring fields of different signal behaviors.

FIG. 2 shows an exemplary embodiment of the rings 24, 34, with in this relative arrangement between the ring 24 of the first sensor 20 and the ring 34 of the second sensor 30 each shadowing element, arranged at the annular elements, generating both with the frontal edge as well as the rear edge an inclining or declining flank in the square-wave signal so that this arrangement is also called an open arrangement.

In the arrangement of the rings 24, 34 shown in FIG. 3 the shadowing elements of the ring 24 partially cover the shadowing elements of the ring 34 so that this can be called a partially covered arrangement.

FIG. 4 shows a schematic illustration of another exemplary embodiment of a device according to the invention with a rotary body 10 embodied as a pedal sprocket shaft bearing, at which respectively one crank 14, 16 each is arranged at the two ends, particularly offset in reference to each other by 180°. A rotary body 12 is arranged at the pedal sprocket shaft bearing 10, which is embodied particularly as a torsion sheath. The torsion sheath is arranged at one side of the pedal sprocket shaft bearing 10 and surrounds the pedal sprocket shaft bearing 10 in a coaxial fashion. The pedal forces of the two cranks 14, 16 are introduced via the cranks 14, 16 into the torsion sheath and here generate a torque. Both force progressions of the cranks 14, 16 mouth in an output 18, which is arranged at the end of the torsion sheath, which is not connected to the pedal sprocket shaft bearing 10. The output 18 is for example embodied as a chain ring of a bicycle, ergometer, or indoor bicycle. The output 18 leads for example to the rear wheel of a bicycle, ergometer, or indoor bike and generates particularly a counter-torque at the torsion sheath. By the torque introduced via the two cranks 14, 16 and the counter-torque acting via the output 18 the rotary body 12, particularly the torsion sheath, is rotated.

As described based on FIG. 1 two sensors 20, 30 are arranged at the torsion sheath at an axial distance A12. By the torsion of the torsion sheath, dependent on the torque, the angular position of the fields of the ring 24 changes in reference to the fields of the ring 34. The change of the angular position of the fields in reference to each other is therefore a measurement for the torque to be measured.

Here, it should not be considered that the torsion should not exceed half the angular distance of the fields of the rings 24, 34, if possible, because otherwise errors might develop in the determination of the torque. Preferably, it is provided to issue an error message in such a case.

FIG. 5 shows a cross-section along the line A-B through FIG. 4, based on which the arrangement of the two sensors 20, 30 is discernible as the rotary body 12 embodied as a torsion sheath. As shown in FIG. 5, the rings 24, 34 of the sensors 20, 30 are arranged in an open arrangement. The transmitter 40 generates a square-wave signal, an example of which being shown in FIGS. 6 and 7.

Now, in the open arrangement there is the option to determine the torque, as described in the following based on FIG. 6.

Various options are shown in FIG. 6 to allocate the flanks and impulses of the square-wave signal to the respective structures of the sensors 20, 30, with every other pulse being allocated to one of the two sensors 20, 30, while the respectively other pulses are allocated to the other one of the two sensors 30, 20. Due to the fact that the collection of measurements can start at any arbitrary point of time, it is not unambiguous which pulse and/or flank is allocated to what sensor 20, 30. Such an allocation is not mandatory, though.

The FIGS. 6a and 6b represent a first option of the allocation of the flanks based only on flanks aligned in opposite directions.

The widths, i.e. the flank distances between an inclining and a subsequent declining flank of each second pulse, allocated to a sensor 20, 30 are marked T1, . . . , Tn, while the widths, i.e. the flank distances between an inclining and a subsequent declining flank of the respectively other pulse are allocated to the second sensor 30 being marked T1, . . . , Tn'. Here, n indicated the number of fields of a type, particularly the signal-generating fields, of a ring 24, 34. Here, T1, . . . Tn and T1', . . . Tn' shall also mark constant values when a torque is applied, which particularly is defined by flank distances of two subsequent flanks, which are caused by the same ring.

In the alternative embodiments shown in FIGS. 6c and 6d the T1, . . . , Tn and T1', . . . , Tn' can be determined as the flank distance between one flank and the second-to-next flank aligned in the same direction and thus representing a period which for example comprises a pulse of a sensor, a subsequent space between two pulses, the subsequent pulse, as well as another subsequent space. Here, it particularly may apply that Ti =Ti'. Here, the T1, . . . , Tn and T1', . . . , Tn' in the exemplary embodiment shown in FIG. 6c may be determined as the distance between a declining and the second-to-next declining flank, while the T1, . . . , Tn and T1', . . . , Tn' in the exemplary embodiment shown in FIG. 6d are determined as the distance between an inclining and the second-to-next inclining flank. In general it would also be possible to determine Ti starting with an inclining and Ti' starting with a declining flank or vice versa, or starting with subsequent inclining or declining flanks.

In FIGS. 6a and 6b the flank distances between the pulses, i.e. particularly the distances between a declining flank and a subsequent inclining flank, are marked with $\alpha 1, \ldots, \alpha n$ or with $\alpha 1', \ldots, \alpha n'$, with the flank distance following a pulse T1, . . . , Tn being marked $\alpha 1, \ldots, \alpha n$, while the flank distance following the pulse T1', . . . , Tn' being marked $\alpha 1', \ldots, \alpha n'$. The flank distances $\alpha 1, \ldots, \alpha n$ or $\alpha 1', \ldots, \alpha n'$ vary during the impingement with torque due to the torsion of the pedal sprocket shaft bearing or the torsion sheath, because the rings 24, 34 distort in reference to each other. This way, the $\alpha 1, \ldots, \alpha n$ or $\alpha 1', \ldots, \alpha n'$ shall indicate the values varying during the impingement with a torque, which are particularly defined by the flank distances of two subsequent flanks, which are caused by different rings.

In alternative embodiments shown in FIGS. 6c and 6d the flank distances $\alpha 1, \ldots, \alpha n$ or $\alpha 1', \ldots, \alpha n'$ may also be determined as distances of two subsequent flanks with identical orientation, particularly as distances of two subsequent declining flanks (cf. FIG. 6c) or as distances of two subsequent inclining flanks (cf. FIG. 6d).

For all options of allocating flanks shown in FIGS. 6a to 6d or other ones, not shown, it is essential that the constant values are determined as distances of flanks, which are caused by the same ring and thus are only dependent on the geometry of the respective ring, not however on any distortion of the two rings in reference to each other, and the variable values $\alpha 1, \ldots, \alpha n$ or $\alpha 1', \ldots, \alpha n'$ are determined as distances of flanks, which are caused by different rings, and which therefore are dependent on the distortion of the two rings in reference to each other and thus on the torque applied.

It must be observed that T1 shall include both the momentless values Tmli as well as the values Tml subject to a moment, each from both sensors 20, 30, and also the momentless values $\alpha i$ as well as the values $\alpha$mli subject to a moment, each of both sensors 20, 30, unless explicitly stipulated otherwise.

In order to determine the generated torque, firstly during the momentless rotation of the torsion sheath or the pedal sprocket shaft bearing the momentless, i.e. load-free, γml—values for one of the two sensors 20, 30 and γ'ml—values for the other of the two sensors 30, 20 are determined via the following formulas:

$$\gamma_{ml} = (\alpha_{ml1} + \alpha_{ml2} + \ldots + \alpha_{mln})/(T_{ml1} + T_{ml2} + \ldots + T_{mln})$$

$$= \Sigma_{i=1}^{n} \alpha_{mli} / \Sigma_{i=1}^{n} T_{mli}$$

and $$\gamma'_{ml} = (\alpha'_{ml1} + \alpha'_{ml2} + \ldots + \alpha'_{mln})/(T'_{ml1} + T'_{ml2} + \ldots + T'_{mln})$$

$$= \Sigma_{i=1}^{n} \alpha'_{mli} / \Sigma_{i=1}^{n} T'_{mli}$$

The γml=values and the γ'ml—values are allocated such that they meet the following condition, so that a correct determination of the torque is possible:

$$\gamma ml < \gamma' ml$$

When introducing a torque the rotary body 10 and the rotary body 12 are distorted, the changed flank distances $\alpha m1, \ldots, \alpha mn$ and $\alpha m1', \ldots, \alpha mn'$ are determined, and the γm—values subjected to a moment are determined for one of the two sensors 20, 30 and γ'm—values for the other of the two sensors 30, 20 as follows:

$$\gamma_m = (\alpha_{m1} + \alpha_{m2} + \ldots + \alpha_{mn})/(T_{m1} + T_{m2} + \ldots + T_{mn})$$

$$= \Sigma_{i=1}^{n} \alpha_{mi} / \Sigma_{i=1}^{n} T_{mi}$$

and $$\gamma'_m = (\alpha'_{m1} + \alpha'_{m2} + \ldots + \alpha'_{mn})/(T'_{m1} + T'_{m2} + \ldots + T'_{mn})$$

$$= \Sigma_{i=1}^{n} \alpha'_{mi} / \Sigma_{i=1}^{n} T'_{mi}$$

The γm—values and the γ'm—values are allocated such that they meet the following condition, so that a correct determination of the torque is possible:

$$\gamma m < \gamma' m$$

The work generated can here be determined as follows:

$$W = \int_0^{2\pi} M d\varphi = \overline{M} 2\pi \approx |(\gamma_m - \gamma_{m1})| k,$$

$$W' = \int_0^{2\pi} M' d\varphi = \overline{M'} 2\pi \approx |(\gamma'_m - \gamma'_{m1})| k,$$

with k being a calibration constant and φ the angle of rotation of the rotary body 10 or 12. The torque generated is determined as follows:

$$\overline{M} = W/2\pi \approx |(\gamma_m - \gamma_{m1})| k/2\pi$$

$$\overline{M'} = W'/2\pi \approx |(\gamma'_m - \gamma'_{m1})| k/2\pi,$$

by adding the two torques $\overline{M}$ and $\overline{M'}$ the overall torque can be determined.

A flowchart is shown in FIGS. 6a and 6f, which illustrates the described process once more in an overview. FIG. 6e shows the first part of the flowchart, in which the load-free values are determined, with it being distinguished between a so-called opposite flank allocation, which is equivalent to the flank allocation according to FIGS. 6a and 6b, and a so-called similar flank allocation, which is equivalent either to the flank allocation according to FIG. 6c or according to FIG. 6d. FIG. 6f shows the second part of the flowchart, in which the moment-impinged values are determined based on the flank allocation and in consideration of the flowchart shown in FIG. 6e certain moment-free values of the torque are determined.

The option is given to determine the torque in a partially covered arrangement, as described in the following based on FIG. 7.

As shown in FIG. 7, each of the pulses comprises a signal-generating element of the ring 24 of the first sensor 20 and portions of a signal-generating element of the ring 34 of the second sensor 30. Here it shall be observed that in the actual signal progression of the square-wave signal determined the fields shown in dark are not visible. The differentiation between pulses or portions of pulses of a sensor 20, 30 from pulses of the other sensor 20, 30 is not possible. In this arrangement the periods are assumed as the constant values and marked T1, ..., Tn, with this representing the flank distances between two flanks aligned in the same direction, particularly two inclining flanks. The flank distances between the pulses are marked α1, ..., αn, with this particularly representing the flank distances between two opposite flanks, particularly between a declining and a subsequent inclining flank. Here, n represents for example the number of fields of one type, for example the signal generating fields of one of the rings 24, 34.

In the following, the momentless ratio is determined with the following formula $$\gamma_{ml} = (\alpha_{ml1} + \alpha_{ml2} + \ldots + \alpha_{mln})/(T_{ml1} + T_{ml2} + \ldots + T_{mln})$$

$$= \Sigma_{i=1}^{n} \alpha_{mli} / \Sigma_{i=1}^{n} T_{mli}$$

as well as the moment-impinged ratio with the following formula $$\gamma_m = (\alpha_{m1} + \alpha_{m2} + \ldots + \alpha_{mn})/(T_{m1} + T_{m2} + \ldots + T_{mn})$$

$$= \Sigma_{i=1}^{n} \alpha_{mi} / \Sigma_{i=1}^{n} T_{mi}$$

The work at the moment-impinged rotary body 10, 12 is determined from the equation $$W = \int_0^{2\pi} M d\varphi = \overline{M} 2\pi \approx (\gamma_m - \gamma_{ml}) k,$$

with k representing a calibration constant and φ the angle of rotation of the rotary body 10 or 12. Finally, the average torque applied upon the rotary body 10, 12 is determined from the equation $$\overline{M} = W/2\pi \approx (\gamma_m - \gamma_{ml}) k/2\pi$$

FIG. 8 shows the device according to FIG. 4, which comprises an additional sensor 41 and a transmitter 42, which is used to determine the angular position. The additional sensor 41 is here arranged at the second sensor 30 and thus fixed in reference thereto. The additional transmitter 42 is exclusively allocated to the additional sensor 41 and detects its rotation during the revolution of the rotary body 10 or the rotary body 12.

FIG. 9 shows a cross-section along the line A-B in FIG. 8, in which the additional sensor 41 is discernible. FIG. 10 shows the square-wave signal generated by the transmitter 40. FIG. 11 shows the square-wave signal generated by the additional transmitter 42. The additional sensor 41 also comprises fields of different signal behavior on a ring, with for example shadowing elements potentially being arranged alternating with light-permeable elements. The shadowing elements preferably show the same width, while the angular distance in reference to each other may be embodied differently. In particular, the shadowing elements of the sensor 41 generate a discernible sequence of signals, by which a determination of the relative angular position of the sensor 41 is possible.

FIG. 12 shows an alternative exemplary embodiment of two sensors 20, 30, in which the sensor 20 is embodied such that a shadowing element is missing in the ring 24 of the first sensor 20, causing the generation of an unambiguous signal structure such that a determination of a zero-position and thus the rotational position is possible (cf. FIG. 13a, 13b). In particular, such a missing element can also be used to count the rotations and/or to start recording measurements.

FIGS. 9 and 12 also show the option to measure the torque at a certain angle of rotation of the torsion sheath. The rotational position is determined via the additional sensor 41 and the additional transmitter 42. Here, for example a method of prior art can be used, such as a Gray-code or a Nonius-method. This way both an absolute angle as well as the direction of rotation can be allocated to the torque to be measured.

The torque dependent on the angle of rotation can be determined as follows. During the momentless rotation of the torsion sheath all individual momentless γml—values are calculated at the position, determined at the same time, as follows:

$$\gamma_{ml1} = \alpha_{ml1}/T_{ml1} \text{ (at position } X°)$$

$$\gamma_{ml2} = \alpha_{ml2}/T_{ml2} \text{ (at position } Y°)$$

$$\ldots$$

$$\gamma_{mln} = \alpha_{mln}/T_{mln} \text{ (at position } n°)$$

and particularly $$\gamma_{mli} = \alpha_{mli}/T_{mli} \text{ (at position } i°).$$

Accordingly, when torque is applied the pedal sprocket shaft bearing and/or the torsion sheath are distorted, the altered phase position is determined, and all individual γm—values impinged with a load are calculated at the position determined for the very same point of time.

$$\gamma_{m1} = \alpha_{m1}/T_{m1} \text{ (at position } X°)$$

$$\gamma_{m2} = \alpha_{m2}/T_{m2} \text{ (at position } Y°)$$

$$\ldots$$

$$\gamma_{mn} = \alpha_{mn}/T_{mn} \text{ (at position } n°)$$

and particularly $$\gamma_{mi} = \alpha_{mi}/T_{mi} \text{ (at position } i°).$$

Via the following formulas then the torque acting in the torsion sheath can be determined via the rotational position, with k representing a material and geometry-dependent calibration constant:

$$M_{1(x°)} = |(\gamma_{m1} - \gamma_{ml1})| k$$

$$M_{2(y°)} = |(\gamma_{m2} - \gamma_{ml2})| k$$

$$\ldots$$

$$M_{n(n°)} = |(\gamma_{mn} - \gamma_{mln})| k$$

A flowchart showing the above-described process to determine the torque dependent on the angle of rotation is once more shown in an overview in FIG. 13c.

FIG. 14 shows another exemplary embodiment for the design of the sensors 20, 30, with one of the fields of the sensor 20 comprising an additional component 45, for example a trigger, which initiates a trigger pulse shown in FIG. 16, which starts the measuring process and/or signalizes a complete rotation and/or allows to determine the rotational position.

FIG. 17 shows another exemplary embodiment of the rings 24, 34 of the sensors 20, 30, with at one of the rings, for example the ring 34 of the second sensor 30, shadowing elements of different widths being arranged such that the determination of the rotational position, the direction of rotation, and the torque is possible by a single signal, namely the square-wave signal determined by the transmitter 40. The sensor is therefore very economical and hardly susceptible to interferences.

FIG. 18 shows the measurement of the torque and the rotational position by a variation of the geometry of the ring 34 of the second sensor 30 according to FIG. 17. FIG. 18a shows the square-wave signal determined by the transmitter 40 without any impingement of torque, FIG. 18c shows the square-wave signal determined by the transmitter 40 with torque being applied. FIG. 18b shows the determination of the positioning values depending on the determined square-wave signal, particularly by forming the ratios of flank distances, particularly by forming the ratios of subsequent constant values Ti-1/Ti.

The determination of the torque occurs via the following formulas: During the momentless rotation all individual momentless γml—values are calculated at the same time as the rotational position determined therefore:

$$\gamma_{m11} = \alpha_{m11}/T_{m11}$$
$$\gamma_{m12} = \alpha_{m12}/T_{m12}$$
$$\ldots$$
$$\gamma_{m1i} = \alpha_{m1i}/T_{m1i}$$
$$\gamma_{m1n} = \alpha_{m1n}/T_{m1n}$$

The rotational positions are determined in this exemplary embodiment as follows (cf. FIG. 18b):

Position X°=$T_1/T_2$
Position Y°=$T_2/T_3$
Position i°=$T_{i-1}/T_i$
Position n°=$T_{n-1}/T_n$ By the appropriate selection of the widths of the different fields of the ring 34 it can be achieved that all values are different within one rotation, so that an unambiguous allocation can be achieved between the values and the respective positions. A graphic illustration of the values of the respective rotational positions and particularly also the direction of rotation is shown in FIG. 18e. The determination of the rotational position occurs by determining the angle allocated to a certain value Ti-1/Ti, the determination of the direction of rotation is possible by determining if the determined values Ti-1/Ti are inclining or declining.

During the moment-impinged rotation all individual moment-impinged γm—values are calculated at the same time as the rotational position determined therefore:

$$\gamma_{m1} = \alpha_{m1}/T_{m1}$$
$$\gamma_{m2} = \alpha_{m2}/T_{m2}$$
$$\ldots$$
$$\gamma_{mi} = \alpha_{mi}/T_{mi}$$
$$\gamma_{mn} = \alpha_{mn}/T_{mn}$$

Finally the torque can be determined as follows, with k representing a material and geometry depending calibration constant:

$$M_{1(x°)} = |(\gamma_{m1} - \gamma_{m11})|k$$
$$M_{2(y°)} = |(\gamma_{m2} - \gamma_{m12})|k$$
$$\ldots$$
$$M_{i(i°)} = |(\gamma_{mi} - \gamma_{m1i})|k$$
$$M_{n(n°)} = |(\gamma_{mn} - \gamma_{m1n})|k$$

A flowchart, which once more illustrates in an overview the described process for determining the angle of rotation and the torques dependent on said angle of rotation from an individual square-wave signal, is shown in FIG. 18d.

FIG. 19 shows another exemplary embodiment of a device according to the invention, with its basic design being equivalent to the devices according to FIG. 4 or 8, with the sensors 20, 30 not being arranged on the exterior of the torsion sheath as in FIG. 4 or 8 but the first sensor 20 being arranged at the pedal sprocket shaft bearing in the space between the pedal sprocket shaft bearing and the torsion sheath and the second sensor 30 on the interior of the torsion sheath in the space between the torsion sheath and the pedal sprocket shaft bearing.

FIG. 20 shows a cross-section through the device according to FIG. 19 along the line A-B. The rings 24, 34 are formed by shadowing or reflecting elements or ones changing the magnetic flow, for example, which are arranged starting at the rotary body 10, embodied as a pedal sprocket shaft bearing, towards the outside or radially towards the inside from the rotary body 12, embodied as a torsion sheath, and here they are arranged circumferentially offset in reference to each other such that gearing forms. Such an arrangement of the sensors 20, 30 is particularly space-saving.

An alternative embodiment of the sensors 20, 30 is shown in FIG. 21, with the sensors 20, 30 being embodied as cylindrical sheaths and the rings being embodied as axial sections of a cylindrical wall, showing mutually engaging gears in the axial direction, which allows a particularly space-saving arrangement.

FIG. 22 shows another exemplary embodiment of a device according to the invention, with its basic design being equivalent to the device according to FIG. 1, showing the fastening of the transmitter 40. The device is generally arranged in an installation sheath 50. The installation sheath 50 is generally arranged via two bearings 51 at the rotary body 10, with the bearings 51 showing play.

The transmitter 40 may be fastened directly at the installation sheath 50 in an embodiment, not shown. This is disadvantageous, though, in that relative motions between the transmitter 40 and the sensors 20, 30 cannot be excluded, here. Accordingly, in the exemplary embodiment 40 shown in FIG. 22 the transmitter 40 is arranged at a housing 52, which is arranged free from play at the first sensor 20 via a bearing 54 free from play. The housing 52 is arranged via a torque-proofing device 56 at the installation sheath 50. Overall, here a type of floating bearing of the transmitter 40 develops, which particularly reduces or even excludes any relative motions between the transmitter 40 and the sensors 20, 30. In an alternative embodiment the transmitter 40 may be arranged via the bearing 54, free from play, at the rotary body 10 or the two sensors 20, 30, instead of at the first sensor 20.

FIG. 23 shows another exemplary embodiment of a device according to the invention, with its basic design being equivalent to a device according to FIG. 1. The device according to FIG. 23 shows, in additional to the transmitter 40, at least one additional transmitter 44, which is arranged in reference to the transmitter 40 for example offset by 180° in reference to the axis of rotation R. In general, the use of three or more transmitters is also possible.

Preferably, the transmitter 44 is embodied identical to the transmitter 40. The transmitter 44 detects particularly a square-wave signal, which is influenced by both sensors 20, 30. This square-wave signal can be evaluated in the same fashion as the square-wave signal received by the transmitter 40, resulting on the one hand in an option for redundant measurements. On the other hand, by averaging the results of both transmitters 40, 44 higher precision can be yielded. In one embodiment at least one additional transmitter 44 is used in a device with sensors 20, 30, as shown in FIG. 17, which shows fields with different widths distributed over the circumference of at least one ring 24, in order to allow determining angles of rotation. By arranging at least two transmitters 40, 44, particularly diametrically opposite each other, at all times one of the transmitters is positioned within the range of fields with smaller widths and one of the transmitters in the range with fields of greater widths, when the widths of the fields increases distributed over the circumference. This way, at all times at least one transmitter is located in an area in which it can yield measurements in short periods of time so that over an entire rotation in short periods of time distance measurements can be recorded, alternating by the transmitter 40 and the other transmitter 44.

LIST OF REFERENCE NUMBERS

10 Rotary body
12 Rotary body
14 Crank
16 Crank
18 Output
20 First sensor
22 Fastening element
24 Ring
30 Second sensor
32 Fastening element
34 Ring
40 Transmitter
41 Additional transmitter
42 Additional transmitter
44 Transmitter
45 Trigger
50 Installation sheath
51 Bearing
52 Housing
54 Bearing
56 Torque-proofing device
A12 Axial distance The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A method for determining the torque applied upon a rotary body that can be driven about an axis of rotation, comprising a first and a second sensor, each of which respectively arranged with a fastening element at the rotary body at an axial distance from each other and comprising rings surrounding the rotary body showing alternating different signal behaviors, wherein one transmitter is allocated jointly to the first sensor and the second sensor, which accepts jointly an output signal from both sensors, from which a square-wave signal is formed, from which in a first step from the flank distances of certain inclining and/or declining flanks of the square-wave signal constant values $T_i$ are determined, which are dependent on the geometry of the rings of the two sensors, and variable values $\alpha_i$, which are dependent on the torque applied, wherein, the two rings of the two sensors are arranged at a set location in reference to each other and the constant values $T_i$, $T_i'$ are defined as the distance of one flank from the second-to-next flank aligned in the same direction or as the distance of two neighboring opposite flanks, particularly the distance between an inclining flank and a subsequent declining flank, and the variable values $\alpha_i$, $\alpha_i'$ as the distance of two neighboring opposite flanks, which are embodied opposite in reference to the flanks used to determine the constant values, particularly the distance between a declining flank and a subsequent inclining flank, or as the distance of two neighboring flanks aligned in the same direction, and that in such arrangement of the two rings of the two sensors in reference to each other over one or more complete rotation(s) of the unstressed, torqueless rotary body the constant values $T_{mli}$, i=1 . . . n and the variable values $\alpha_{mli}$, i=1 . . . n, allocated to the first sensor, are each added and the constant values $T_{mli}'$, i=1 . . . n, and the variable values $\alpha_{mli}'$, i=1 . . . n, allocated to the second sensor, are each added and momentless ratios $$\gamma_{m1} = \frac{(\alpha_{ml1} + \alpha_{ml2} + \ldots + \alpha_{mln})}{(T_{ml1} + T_{ml2} + \ldots + T_{mln})} = \frac{\sum_{i}^{n} = 1^{\alpha_{mli}}}{\sum_{i}^{n} = 1^{T_{mli}}}$$

and $$\gamma_{m1}' = \frac{(\alpha_{ml1}' + \alpha_{ml2}' + \ldots + \alpha_{mln}')}{(T_{ml1}' + T_{ml2}' + \ldots + T_{mln}')} = \frac{\sum_{i}^{n} = 1^{\alpha_{mli}'}}{\sum_{i}^{n} = 1^{T_{mli}'}}$$

are formed, with the $\gamma_{ml}$—values and $\gamma_{ml}'$—values meeting the following condition:

$$\gamma_{ml} \approx \gamma_{ml}',$$

with over one or more complete rotations of the rotary body stressed with the torque to be determined the constant values $T_{mi}$, i=1 . . . n, allocated to the first sensor, and the variable values $\alpha_{mi}$, i=1 . . . n, are each added and the constant values $T_{mi}'$, i=1 . . . n, allocated to the second sensor, and the variable values $\alpha_{mi}'$, i=1 . . . n are each added and the moment-impinged ratios $$\gamma_{m1} = \frac{(\alpha_{m1} + \alpha_{m2} + \ldots + a_{mn})}{(T_{m1} + T_{m2} + \ldots + T_{mn})} = \frac{\sum_{i}^{n} = 1^{a_{mi}}}{\sum_{i}^{n} = 1^{T_{mi}}}$$

and $$\gamma_{m1}' = \frac{(\alpha_{m1}' + \alpha_{m2}' + \ldots + a_{mn}')}{(T_{m1}' + T_{m2}' + \ldots + T_{mn}')} = \frac{\sum_{i}^{n} = 1^{a_{mi}'}}{\sum_{i}^{n} = 1^{T_{mi}'}}$$

are formed, with the $\gamma_m$—values and $\gamma'_m$—values meeting the following condition:

$$\gamma_m < \gamma'_m$$

with the work at the rotary body impinged with a moment being determined from the equations $$W = \int_0^{2\pi} M d\varphi = \overline{M} 2\pi \sim |(\gamma_m - \gamma_{m1})|k$$

and $$W' = \int_0^{2\pi} M' d\varphi = \overline{M'} 2\pi \approx |(\gamma'_m - \gamma'_{m1})|k,$$

with k representing a calibration constant and φ the angle of rotation of the rotary body and with the entire torque being determined by $\overline{MM'}$ with $$\overline{M} = \frac{W}{2\pi} \approx |(\gamma_m - \gamma_{m1})|k/2\pi$$

and $$\overline{M'} = \frac{W'}{2\pi} \approx |(\gamma_m - \gamma_{m1})|k/2\pi.$$

2. The method of claim 1, wherein the formation of totals during one rotation of the rotary body is newly started at least at two different flanks, preferably at every inclining and every declining flank.

3. A device for determining torque applied upon a rotary body that can be driven about an axis of rotation according to the method of claim 1, with a first and a second sensor, each of which arranged with a fastening element at the rotary body at an axial distance from each other, and rings surrounding the rotary body made from fields with alternating different signal, wherein one transmitter is arranged jointly to the first sensor and the second sensor, which accepts an output signal jointly from both sensors, from which a square-wave signal can be determined, and that not all fields of one ring show identical sizes.

4. The device of claim 3, wherein at least one of the rings is distanced axially in reference to the fastening element of the corresponding sensor at the rotary body such that the rings of the two sensors are arranged without or with a small axial distance from each other.

5. The device of claim 3, wherein the transmitter is based on an optic, inductive, magnetic, or capacitive principle.

6. The device of claim 3, wherein the transmitter is arranged at the rotary body and/or at one or both of the sensors without any play.

7. The device of claim 3, wherein the number of fields of both rings is identical.

8. The device of claim 3, wherein the rings comprise transparent or absorbing fields or that the rings comprise reflecting and non-reflecting fields.

9. The device of claim 3, wherein the rotary body is embodied as a pedal sprocket shaft bearing.

10. The device of claim 3, wherein the rotary body is embodied as a pedal sprocket shaft bearing, with a torsion shaft being arranged around it, which is arranged with a first end at a first end of the pedal sprocket shaft bearing, with the output occurring at a second end of the torsion sheath opposite the first end, with one of the sensors being arranged at the torsion sheath and the other one of the sensors at the pedal sprocket shaft bearing.

11. The device of claim 3, wherein the rotary body is embodied as a torsion sheath, which is arranged around a pedal sprocket shaft bearing and which is arranged with a first end at a first end of the pedal sprocket shaft bearing, with the output occurring at a second end of the torsion sheath opposite the first end, with both sensors being arranged at the torsion sheath.

12. The device of claim 3, wherein the level of the fields of the rings is arranged cross-wise, particularly perpendicularly in reference to the axis of rotation of the rotary body.

13. The device of claim 3, wherein the rings are embodied as an axial section of a cylindrical wall and show in the axial direction mutually engaging gears so that on a circumferential line alternating fields are arranged of the first sensor and the second sensor.

14. The device of claim 3, further comprising means to determine the angle of rotation, which particularly include an additional sensor and an additional transmitter.

* * * * *

UNITED STATES PATENT AND TRADEMARK OFFICE
CERTIFICATE OF CORRECTION

PATENT NO. : 9,945,741 B2
APPLICATION NO. : 14/431403
DATED : April 17, 2018
INVENTOR(S) : Allard et al.

It is certified that error appears in the above-identified patent and that said Letters Patent is hereby corrected as shown below:

In the Claims

Column 20, Line 53, the mathematical formula should appear as follows:

$$\Upsilon_m = \frac{(\alpha_{m l 1} + \alpha_{m l 2} + \ldots + a_{m l n})}{(T_{m l 1} + T_{m l 2} + \ldots + T_{m l n})} = \frac{\sum_{i}^{n} = 1^{\alpha_{m l i}}}{\sum_{i}^{n} = 1^{T_{m l i}}}$$

Column 20, Line 60, the mathematical formula should appear as follows:

$$\Upsilon'_m = \frac{(\alpha'_{m l 1} + \alpha'_{m l 2} + \ldots + a'_{m l n})}{(T'_{m l 1} + T'_{m l 2} + \ldots + T'_{m l n})} = \frac{\sum_{i}^{n} = 1^{\alpha'_{m l i}}}{\sum_{i}^{n} = 1^{T'_{m l i}}}$$

Signed and Sealed this
Twelfth Day of February, 2019

Andrei Iancu
*Director of the United States Patent and Trademark Office*